United States Patent
Grassadonia et al.

(10) Patent No.: US 9,378,491 B1
(45) Date of Patent: *Jun. 28, 2016

(54) PAYMENT TRANSFER BY SENDING E-MAIL

(71) Applicant: Square, Inc., San Francisco, CA (US)

(72) Inventors: Brian Grassadonia, San Francisco, CA (US); Jochen Bekmann, San Francisco, CA (US); Alan Paulin, Waterloo (CA)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,017

(22) Filed: Apr. 4, 2014

Related U.S. Application Data

(60) Provisional application No. 61/891,342, filed on Oct. 15, 2013.

(51) Int. Cl.
G06Q 40/00 (2012.01)
G06Q 20/10 (2012.01)

(52) U.S. Cl.
CPC .............. G06Q 20/10 (2013.01); G06Q 40/00 (2013.01)

(58) Field of Classification Search
USPC .................................................. 705/35–45
See application file for complete search history.

(56) References Cited

U.S. PATENT DOCUMENTS

| | | | |
|---|---|---|---|
| 6,049,785 A | 4/2000 | Gifford | |
| 6,246,996 B1 | 6/2001 | Stein et al. | |
| D459,730 S | 7/2002 | Lee | |
| 7,194,437 B1 | 3/2007 | Britto et al. | |
| 7,376,587 B1 | 5/2008 | Neofytides et al. | |
| D580,449 S | 11/2008 | Nam | |
| 7,533,064 B1 * | 5/2009 | Boesch | 705/67 |
| 7,587,342 B2 | 9/2009 | Neofytides et al. | |
| 7,606,734 B2 | 10/2009 | Baig et al. | |

(Continued)

FOREIGN PATENT DOCUMENTS

| | | | |
|---|---|---|---|
| AU | 2014201444 B1 | 7/2014 | |
| CA | 2 332 656 A1 * | 7/2002 | ............. G07F 19/00 |

(Continued)

OTHER PUBLICATIONS

Money Can't Buy Love, but i can certainly show it. PayPal. Aug. 27, 2013. http://web. archive.org/web/20130827230842/https:/ /www. paypal.com/us/webapps/ mpp/ send-money-online[.*

(Continued)

*Primary Examiner* — Stephanie M Ziegle
(74) *Attorney, Agent, or Firm* — Perkins Coie LLP

(57) ABSTRACT

Described is a technology for seamless initiation of a transfer of payment from a sender to a recipient by sending email, without requiring any account creation and/or login procedure. The technology can involve sending payment from one mobile device to another. In one aspect, the technology includes receiving a payment amount from a sender via the sender's mobile device, causing an email with pre-populated information to be generated using a native email application on the mobile device, and initiating the process to transfer the payment amount upon sending of the email. The technology enables a simplified payment transaction system for ordinary consumers without the hassle of having to sign up, to remember a user account and a password, and to login for sending or receiving every payment transaction, while not sacrificing the essential security feature of authenticating the user for every payment transaction.

22 Claims, 18 Drawing Sheets

(56) References Cited

U.S. PATENT DOCUMENTS

| | | | |
|---|---|---|---|
| 7,610,222 | B2 | 10/2009 | Neofytides et al. |
| 7,778,890 | B1 | 8/2010 | Bezos et al. |
| D624,930 | S | 10/2010 | Agnetta et al. |
| 7,848,980 | B2 | 12/2010 | Carlson |
| D640,277 | S | 6/2011 | Woo |
| D660,861 | S | 5/2012 | Lee et al. |
| 8,255,983 | B2 | 8/2012 | Schultz et al. |
| D675,222 | S | 1/2013 | Woo et al. |
| 8,346,659 | B1* | 1/2013 | Mohsenzadeh ............ 705/39 |
| 8,386,498 | B2 | 2/2013 | Whitehouse |
| D678,896 | S | 3/2013 | Matas |
| 8,401,009 | B1 | 3/2013 | Dorsey et al. |
| 8,447,693 | B2 | 5/2013 | Lynch et al. |
| D684,163 | S | 6/2013 | Anzures |
| 8,500,018 | B2 | 8/2013 | McKelvey et al. |
| 8,573,486 | B2 | 11/2013 | McKelvey et al. |
| D705,806 | S | 5/2014 | Jung |
| D707,248 | S | 6/2014 | Jung et al. |
| 8,751,379 | B1 | 6/2014 | Bueche, Jr. |
| 8,762,272 | B1 | 6/2014 | Cozens et al. |
| 8,870,070 | B2 | 10/2014 | McKelvey et al. |
| D718,327 | S | 11/2014 | Nies et al. |
| 8,893,296 | B2 | 11/2014 | Dumais et al. |
| 8,966,621 | B1 | 2/2015 | Johansson et al. |
| 9,016,572 | B2 | 4/2015 | Babu et al. |
| D730,367 | S | 5/2015 | Ryan et al. |
| 9,047,600 | B2 | 6/2015 | Zhou et al. |
| 9,064,252 | B2 | 6/2015 | Randazza et al. |
| D737,852 | S | 9/2015 | De La Rosa et al. |
| 2002/0026396 | A1 | 2/2002 | Dent et al. |
| 2005/0071229 | A1 | 3/2005 | Mashinsky et al. |
| 2005/0234822 | A1 | 10/2005 | VanFleet et al. |
| 2007/0214080 | A1 | 9/2007 | Babi et al. |
| 2007/0255653 | A1 | 11/2007 | Tumminaro et al. |
| 2009/0132423 | A1* | 5/2009 | Liu ............................ 705/70 |
| 2010/0042538 | A1 | 2/2010 | Dheer et al. |
| 2010/0191653 | A1 | 7/2010 | Johnson et al. |
| 2010/0306099 | A1* | 12/2010 | Hirson et al. ............ 705/38 |
| 2011/0055077 | A1 | 3/2011 | French et al. |
| 2011/0137789 | A1 | 6/2011 | Kortina et al. |
| 2011/0208653 | A1* | 8/2011 | Landesmann ............ 705/44 |
| 2011/0250909 | A1 | 10/2011 | Mathias et al. |
| 2011/0271349 | A1 | 11/2011 | Kaplan |
| 2011/0313921 | A1 | 12/2011 | Dheer et al. |
| 2011/0320343 | A1* | 12/2011 | Koh et al. ............... 705/39 |
| 2012/0054102 | A1 | 3/2012 | Schwartz et al. |
| 2012/0158589 | A1 | 6/2012 | Katzin et al. |
| 2012/0209970 | A1 | 8/2012 | Scipioni et al. |
| 2012/0239417 | A1 | 9/2012 | Pourfallah et al. |
| 2012/0246079 | A1 | 9/2012 | Wilson et al. |
| 2012/0253852 | A1 | 10/2012 | Pourfallah et al. |
| 2012/0310743 | A1 | 12/2012 | Johri |
| 2012/0310830 | A1* | 12/2012 | Paulsen et al. ............ 705/44 |
| 2012/0323978 | A1 | 12/2012 | Van Rooyen et al. |
| 2013/0006848 | A1 | 1/2013 | Kuttuva |
| 2013/0060689 | A1 | 3/2013 | Oskolkov et al. |
| 2013/0060708 | A1 | 3/2013 | Oskolkov et al. |
| 2013/0325705 | A1 | 12/2013 | Laird et al. |
| 2013/0325709 | A1* | 12/2013 | Pollin et al. ............... 705/40 |
| 2014/0108247 | A1 | 4/2014 | Artman et al. |
| 2014/0129428 | A1* | 5/2014 | Tyler et al. ............... 705/39 |
| 2014/0156512 | A1 | 6/2014 | Rahman et al. |
| 2014/0244506 | A1 | 8/2014 | Gramling |
| 2014/0279436 | A1 | 9/2014 | Dorsey et al. |
| 2014/0279444 | A1 | 9/2014 | Kassemi et al. |
| 2014/0279446 | A1 | 9/2014 | Dorsey et al. |
| 2014/0279447 | A1 | 9/2014 | Dorsey et al. |
| 2014/0372318 | A1 | 12/2014 | Bonestell et al. |
| 2015/0127530 | A1 | 5/2015 | Wick et al. |
| 2015/0242663 | A1 | 8/2015 | Babu et al. |
| 2015/0278799 | A1 | 10/2015 | Palanisamy |
| 2016/0078448 | A1 | 3/2016 | Dorsey et al. |

FOREIGN PATENT DOCUMENTS

| | | |
|---|---|---|
| CA | 2 740 206 A1 | 2/2010 |
| CA | 2 845 817 A1 | 9/2014 |
| EP | 2 779 081 A1 | 9/2014 |
| JP | 2007-317173 A | 12/2007 |
| KR | 10-2009-0036165 A | 4/2009 |
| WO | 2011/081952 A1 | 7/2011 |
| WO | 2014150282 A1 | 9/2014 |

OTHER PUBLICATIONS

Warfel, Dave. Customizing mailto: Links. The Great Escape Blog. Dec. 15, 2012. http://blog.escapecreative.com/customizing-mailto-links/.*

Murphy, Eamon. Google Links Wallet to Gmail, Letting Users Attach Money to Emails. May 17, 2013. http://www.dailyfinance.com/on/google-wallet-gmail-email-money/.*

P Reilly Website. Send Money to Anyone. Oct. 26, 2004. https://web.archive.org/web/20041026014127/http://www.oreilly.com/pub/h/2144.*

U.S. Appl. No. 14/246,023, of Andersen, R. et al., filed Apr. 4, 2014.

U.S. Appl. No. 14/256,893, of Beckmann, J. et al., filed Apr. 18, 2014.

Non-Final Office Action mailed Jun. 4, 2014, for U.S. Appl. No. 14/246,023, of Andersen, R. et al., filed Apr. 14, 2014.

Money Can't Buy Love But It Can Certainly Show It. PayPal, <http://. web. arch ive.org/web/20130827230842/https :/ /www. paypal.com/us/webapps/mpp/send -money-online>, Aug. 27, 2013, (Retrieved May 28, 2014). (6 pages).

Personal Finance. Pay Pal. <http:l/web.archive.org/web/20130828101500/http://www.windowsphone.com/en s/; store/app/paypa1/75738196-1 db2-49d9-afb1-d66a34d19fb6>, Aug. 28, 2013. (Retrieved May 29, 2014) (3 pages).

Sapsford, Jathon. "You've Got Mail (With Cash!)—PayPal Sees Torrid Growth With a Service That Sents Money Across the Internet" Wall Street Journal. Feb. 16, 2000. (6 pages).

Beaming Money by Email is Web's Next Killer App. PR Newswire. Nov. 16, 1999:1. (6 pages).

Restriction Requirement mailed Sep. 8, 2014, U.S. Appl. No. 14/256,893, of Beckmann, J. et al., filed Apr. 18, 2014.

Non-Final Office Action mailed Sep. 4, 2015, for U.S. Appl. No. 14/260,241, of Dorsey, J., et al., filed Apr. 23, 2014.

Restriction Requirement mailed Sep. 10, 2015, for U.S. Appl. No. 14/260,194, of Dorsey, J., et al., filed Apr. 23, 2014.

Supplemental Notice of Allowance mailed Sep. 24, 2015, for U.S. Appl. No. 14/272,367, of Dorsey, J., et al., filed May 7, 2014.

"Chirpify.com, Homepage," Retrieved from the internet URL: https://www.chirpify.com/, on Mar. 25, 2013, pp. 1-13.

"Interac e-Transfer," Interac, Retrieved from the internet URL: http://www.interac.ca/index.php/en/interac-etransfer/etransfer-detail, on Mar. 25, 2013, pp. 1-3.

"Money In The Bank, Fast," Venmo.com, Published May 30, 2011, Retrieved from the internet URL: http://blog.venmo.com/hf2t3h4x98p5e13z82pl8j66ngcmry/money-in-the-bank-fast, on Jun. 25, 2014, pp. 1-2.

"New Apps for iPhone & Android," Venmo.com, dated Feb. 16, 2011, Retrieved from the internet URL: http://blog.venmo.com/hf2t3h4x98p5e13z82pl8j66ngcmry/brand-new-venmo-apps-for-iphone-and-android, on Jun. 25, 2014, pp. 1-4.

Anonymous, "Ask Dr Dedupe • A . . . : NetApp Community," Published Sep. 8, 2009, Retrieved from the Internet URL: https://communities.netapp.com/community/netapp-blogs/drdedupe/blog/authors/parks?start=45, on Jul. 7, 2014, pp. 1-15.

Electronic Funds Corporation, Introduction to ACH Processing—"Processing Your Funds at the Speed of Light," Retrieved from the internet URL: http://www.achnetwork.com/introtoach.html, on Mar. 25, 2013, p. 1-1.

El-Qorchi, M., "The Hawala System," Finance and Development, Dec. 2002, vol. 39, No. 4, Retrieved from the internet URL: http://www.gdrc.org/icm/hawala.html, on Nov. 7, 2014, pp. 1-5.

Fowler, J., "8 Low-Cost Ways to Transfer Money," Published Apr. 21, 2011, Retrieved from the internet URL: http://www.investopedia.com/financial-edge/0411/7-low-cost-ways-to-transfer-money.aspx, on Jul. 8, 2014, pp. 1-3.

(56) References Cited

OTHER PUBLICATIONS

Geffner, M., "Swipe! How Do Debit Cards Work?," Bankrate.com, Published Dec. 12, 2012, Retrieved from the internet URL: http://www.bankrate.com/finance/banking/how-do-debit-cards-work.aspx, on Mar. 25, 2013, pages 1-2.
Kim, R., "ChirpifY Turns Twitter Into A Payment and Commerce Platform," Gigaom, Feb. 15, 2012, Retrieved from the internet URL: http://gigaom.com/2012/02/15/chirpify-turns-twitter-into-a-payment-and-commerce-platform/, on Mar. 25, 2013, pp. 1-4.
Kitterman, A. S., "Sender Policy 1-14 Framework (SPF) Authentication Failure Reporting Using the Abuse Reporting Format, rfc. 6652.txt," Internet Engineering Task Force (IETF), Published by Internet Society (ISOC), Published Jun. 25, 2012, pp. 1-8.
Klensin, J., "RFC 5321—Simple Mail Transfer Protocol," Published Oct. 2008, Retrieved from the internet URL: https://web.archive.org/web/20131012021519/http://tools.ietf.org/html/rfc5321, on Feb. 16, 2015, pp. 1-95.
Lomas, N., "Amex Launches Pay By Tweet, Turns Purchases Into Adverts," Tech Crunch, Published Feb. 12, 2013, Retrieved from the internet URL: http://techcrunch.com/2013/02/12/amex-pay-by-tweett, on Mar. 25, 2013, pp. 1-6.
Moosberg, W., "The Money Is in the Email," All things, Published Oct. 15, 2013, Retrieved from the internet URL: http://allthingsd.com/?p=365900&ak_action=printable, on Jul. 8, 2014, pp. 1-3.
Penrose, P., "Email Payment Challenges Banks," Dow Jones, Banking Technology, Mar. 1, 2000, pp. 1-2.
Schreiber, D., "'You've got Dwolla!'—Cash transfer startup rolls out email option," Silicon Prairie News, Published Jan. 11, 2011, Retrieved from the internet URL: http://www.siliconprairienews.com/2011/01/you-ve-got-dwolla-cash-transfer-startup-rolls-out-email-option, on Jul. 8, 2014, pp. 1-5.
Stern, J., "Show Me the Money: The Best Apps to Pay Friends Back," Wall Street Journal, Published May 14, 2014, Retrieved from the internet URL: http://online.wsj.com/news/articles/SB10001424052702304536104579558071421978060, on Jun. 25, 2014, pp. 1-4.
Non-Final Office Action mailed Jul. 8, 2013 for U.S. Appl. No. 13/839,623 of Dorsey, J. et al., filed Mar. 15, 2013.
U.S. Appl. No. 14/012,826 of Lee, et al., filed Aug. 23, 2013.
Notice of Allowance mailed Oct. 18, 2013 for U.S. Appl. No. 13/839,623 of Dorsey, J. et al., filed Mar. 15, 2013.
U.S. Appl. No. 14/260,194 of Dorsey, J. et al., filed Apr. 23, 2014.
Patent Examination Report No. 1 mailed on Apr. 7, 2014 in Australian Patent Application No. 2014201444 of Dorsey, J. et al., filed Mar. 13, 2014.
International Search Report and Written Opinion in International Patent Application No. PCT/US2014/022825, filed Mar. 10, 2014, received Jun. 24, 2014, 13 pages.
Notice of Acceptance mailed on Jul. 2, 2014 in Australian Patent Application No. 2014201444, of Dorsey, J. et al., filed Mar. 13, 2014.
Non-Final Office Action mailed Jul. 10, 2014 for U.S. Appl. No. 14/272,367, of Dorsey, J. et al., filed May 7, 2014.
European Search Report mailed Jul. 17, 2014 in European Patent Application No. 14 155 428.7, of Dorsey, J. et al., filed Feb. 17, 2014.
Office Action mailed on Aug. 8, 2014 in European Patent Application No. 14 155 428.7 of Dorsey, J. et al., filed Feb. 17, 2014.
Office Action mailed on Nov. 13, 2014 in Canadian Patent Application No. 2,845,817, of Dorsey, J. et al., filed Mar. 12, 2014.
Non-Final Office Action mailed Nov. 17, 2014 for U.S. Appl. No. 14/066,991 of Dorsey, J. et al., filed Oct. 30, 2013.
Final Office Action mailed Nov. 20, 2014 for U.S. Appl. No. 14/272,367 of Dorsey, J. et al., filed May 7, 2014.
Non-Final Office Action mailed Dec. 1, 2014 for U.S. Appl. No. 14/246,023 of Andersen, R. et al., filed Apr. 4, 2014.
Non-Final Office Action mailed Mar. 11, 2015 for U.S. Appl. No. 14/256,893, of Beckmann, J. et al., filed Apr. 18, 2014.
Final Office Action mailed May 21, 2015, for U.S. Appl. No. 14/246,023, of Andersen, R., et al., filed Apr. 4, 2014.
Restriction Requirement mailed May 26, 2015, for U.S. Appl. No. 14/260,241, of Dorsey, J., et al., filed Apr. 23, 2014.
Hamburger, E., "Square Cash lets anyone with a debit card send money instantly over email," The Verge, dated Oct. 15, 2013, Retrieved from the Internet URL: http://www.theverge.com/2013/10/15/4842518/square-cash-send-money-over-email-iphoneandroid, on Oct. 28, 2015, pp. 1-7.
Prabhu, "PayPal unveils PayPal Here Payment Solution for Small Enterprises," 91 mobile, dated Mar. 17, 2012, Retrieved from the Internet URL: http://www.91mobiles.com/blog/paypal-unveils-paypal-here-payment-solution-forsmall-enterprises.html, on Oct. 28, 2015, pp. 1-5.
Robischon, N., "Getting Square: A Guide to the New Mobile Credit Card Payment System for iPhone and Android," Fast Company, dated May 11, 2010, Retrieved from the Internet URL: http://www.fastcompany.com/1643624/getting-square-guide-new-mobile-credit-cardpayment-system-iphone-and-android, on Oct. 28, 2015, pp. 1-7.
Schuppelius, M., "Innovative Payment Companies: iZettle—Mobile Card Processing the Swedish Way," Payment Observer, dated Apr. 11, 2012, Retrieved from the Internet URL: http://www.paymentobserver.com/tag/izettle, on Oct. 28, 2015, pp. 1-8.
"Square Cash Beams Friends Money Via Email," dated Sep. 15, 2013, Retrieved from the Internet URL: http://www.fastcodesign.com/3020143/square-cash-beams-friends-money-via-email, on Oct. 28, 2015, pp. 1-11.
Wiener, H., "The Four Hundred—Mad Dog 21/21: Not Weather, Nor Whether But When," dated Apr. 9, 2012, IT Jungle, vol. 21, No. 13, pp. 1-5 (Apr. 9, 2012).
Non-Final Office Action mailed Nov. 10, 2015, for U.S. Appl. No. 29/488,588, of Rhodes, M., et al., filed Apr. 21, 2014.
Non-Final Office Action mailed Dec. 9, 2015, for U.S. Appl. No. 14/260,194, of Dorsey, J., et al., filed Apr. 23, 2014.
Application for Registration of an Industrial Design Examiner's Report in Canadian Patent Application No. 159224, mailed Aug. 25, 2015.
Decision to Refuse mailed Sep. 22, 2015, in European Patent Application No. 14 155 428.7, of Dorsey, J. et al., filed Feb. 17, 2014.
European Patent Office; "EPO Summary of Arguments", Minutes of the Oral Proceedings before the Examining Division; Sept 22, 2015; Munich, DE.
Notice of Allowance mailed Jul. 15, 2015, for U.S. Appl. No. 14/272,367, of Dorsey, J., et al., filed May 7, 2014.
Final Office Action mailed Aug. 4, 2015, for U.S. Appl. No. 14/256,893, of Bekmann, J., et al., filed Apr. 18, 2014.
U.S. Appl. No. 29/488,588, of Rhodes, M., et al., filed Apr. 21, 2014.
U.S. Appl. No. 14/444,741 by Seeman, D., et al., filed Jul. 28, 2014.
Application for Registration of an Industrial Design Examiner's Report in Canadian Patent Application No. 159224, mailed Mar. 6, 2015.
Notice of Allowance mailed Jun. 8, 2015, for U.S. Appl. No. 14/246,023, of Andersen, R., et al., filed Apr. 4, 2014.
Final Office Action mailed Jun. 15, 2015, for U.S. Appl. No. 14/066,991, of Dorsey, J., et al., filed Oct. 30, 2013.
Moore, P., "Take Payments Via Email-Pay by Link," dated May 23, 2013, Retrieved from the Internet URL: http://www.ist-e-next.net/e-commerce/payments-via-email-pay-by-link.html, pp. 7.
Final Office Action mailed Jan. 29, 2016, for U.S. Appl. No. 14/260,241, of Dorsey, J., et al., filed Apr. 23, 2014.
Final Office Action mailed Mar. 9, 2016, for Design U.S. Appl. No. 29/488,588, of Rhodes, M., et al., filed Apr. 21, 2014.
Non-Final Office Action mailed Mar. 11, 2016, for U.S. Appl. No. 14/066,991, of Dorsey, J., et al., filed Oct. 30, 2013.
Non-Final Office Action mailed Apr. 8, 2016, for U.S. Appl. No. 14/012,826, of Lee, R., et al., filed Aug. 28, 2013.
Non-Final Office Action mailed Apr. 8, 2016, for U.S. Appl. No. 14/256,893, of Bekmann, J., et al., filed Apr. 18, 2014.
Advisory Action mailed Apr. 20, 2016, for Design U.S. Appl. No. 29/488,588, of Rhodes, M, et al., filed Apr. 21, 2014.

* cited by examiner

PAYMENT TRANSFER BY SENDING E-MAIL

CROSS-REFERENCE TO RELATED APPLICATIONS

This application claims priority to U.S. Provisional Application Ser. No. 61/891,342 filed Oct. 15, 2013, entitled "Email Payment Transaction," which is incorporated herein by reference in its entirety for all purposes.

BACKGROUND

Financial transactions are a crucial part of our everyday lives. On one end, there are financial transactions between merchants and consumers. On the other end, there are financial transactions between consumers. To service non-sophisticated consumers, payment from one party to another should remain simple and easy to execute. However, any solutions for consumer-to-consumer payments, especially over the Internet, must balance the need for security and authentication, as well as the need for simplicity of execution.

BRIEF DESCRIPTION OF THE DRAWINGS

Embodiments of the disclosed technology will be described and explained through the use of the accompanying drawings in which.

Figure 1:
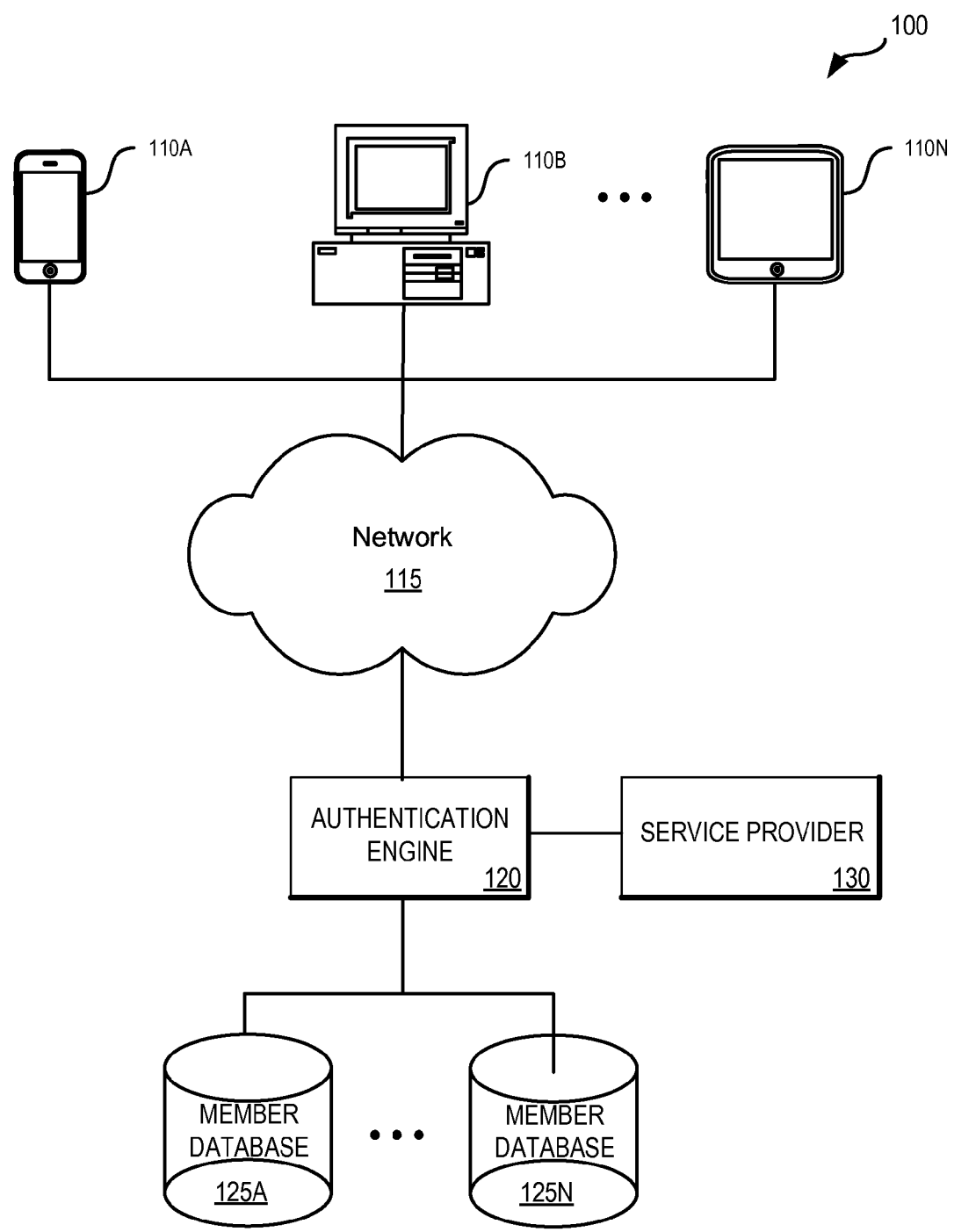
FIG. 1 illustrates an example of a networked-based environment in which some embodiments of the disclosed technology may be utilized.

The drawings have not necessarily been drawn to scale. For example, the dimensions of some of the elements in the figures may be expanded or reduced to help improve the understanding of the embodiments of the disclosed technology. Similarly, some components and/or operations may be separated into different blocks or combined into a single block for the purposes of discussion of some of the embodiments of the disclosed technology. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Introduced here is a technology for simplifying consumer-to-consumer transactions by use of an email mechanism. An example consumer-to-consumer transaction is a payment transaction to transfer money. Today, consumer-to-consumer transaction solutions typically require some form of registration by both of the consumers involved in the transaction (i.e., a sender and a recipient of the payment) before the payment transfer can occur. The registration generally includes an account creation process and a login verification process. In particular, a consumer must (a) enter various account information (e.g., name, address, email address, etc.) to create an account with a particular payment service, and (b) wait for a verification email in order to verify the customer's identity associated with the newly created account, for example, by clicking on a web address included in the verification email to enter various authentication credentials (e.g., login name, password, etc.). Some existing solutions also require verification of the banking institution(s) linked to the account (e.g., verify authentication amount deposited in the customer's bank account). In contrast, the technology introduced here provides efficient execution of financial transactions (e.g., payment transfers) by sending of an email message from a consumer's computing device to a payment service, without the need for any beforehand registration by the consumer (i.e., the sender) or the recipient.

In at least some embodiments, the technology utilizes an application that causes a native email application of the consumer's computing device to transmit an email message. The application further causes a token message to be transmitted from the computing device to the payment service, independent of the email message. The email message can include a payment amount to be transferred to a recipient, the recipient's name, a request for the payment service to transfer the payment amount to the recipient, and a message token. The token message can include the message token and an app token. The payment service can analyze the email message by comparing the message token in the email message in relation to the message token and the app token in the token message. In particular, the payment service, based on the email message, can identify the computing device of the consumer, verify that the email message has been sent from an email address of the consumer, and verify that the computing device is the only one capable of having produced the e-mail message. Having verified the email message (and the authenticity of the request to transfer money), the payment service initiates the process to transfer the payment amount. Hence, the technology provides not only convenience in the transfer of the payment, but also security in the transfer for both the consumer and the recipient.

Consider the following example of a user making a payment transfer, where the example is discussed for illustrative purpose only. In accordance with various embodiments, the user (i.e., sender), using a user computing device, starts an application to request a payment service to transfer money from a financial account of the user to a financial account of a second user (i.e., recipient). In particular, the user submits to the application a payment amount to be transferred, for example, using a keyboard of the computing device.

In response to the user's transfer request, the application generates a first unique token and a second unique token. The first unique token can be a randomly-generated number called an app token. The second unique token may be a message token that includes a specially constructed keyed-hash message authentication code (HMAC). One feature of an HMAC is that the HMAC is a one-way cryptographic hash of some agreed-upon data, random data, non-random data, and/or combination thereof. In some embodiments, the HMAC may include the app token. As a result, another party cannot reverse-compute the app token from a message token, but given the app token, can re-compute the same message token as a way of validation.

The application calls the native e-mail application on the computing device, and generates an e-mail that includes the second unique token (i.e., the message token). The application, having access to the user's e-mail via the native e-mail application, sends a secure message to the authentication engine. The secure message can contain the user's e-mail address and the second unique token. The e-mail can be sent to an e-mail address associated with the authentication engine.

After sending the e-mail, the computing device can then make a separate secure connection to the authentication engine and supplies both the message token and the app token (e.g., by transmitting a token message containing the message token and the app token). The authentication engine can verify that the email was sent by the user (i.e., from the computing device) by taking the message and app tokens included in the token message supplied via the secure connection, re-computing the message token from the app token, and comparing the recomputed message token to the message token included in the email received independently through a different channel (e.g., from the native email application). If the recomputed message token and the message token match, verification is successful. Such verification provides proof that the computing device making the secure connection is the same one that generated the email (using native email application executing on the device). By completing this verification, the authentication engine verifies that the computing device is the only one capable of having produced the e-mail that included the message token. Such verification constitutes a "login" to a service provider (e.g., a payment processing service, an online video content provider, etc.) without providing a username or password. Hence, the user, on the front end, is relieved of the burden of having to complete manually the process of account creation and login every time the user desires to make a payment transfer.

In some instances, the authentication engine can work in coordination with a spoof-checking mechanism to verify that the e-mail was sent from the user's e-mail address (i.e., the e-mail was not spoofed). A user's e-mail address is spoofed when an e-mail is sent from a different e-mail address, but is made to look like it was sent from the user's e-mail address. The spoof-checking mechanism can utilize a set of criteria to validate whether the email has been actually sent from a user-ID and a domain specified in the email address in order to determine if the email is authentic, spoofed, or uncertain. The spoof-checking mechanism can be, or a part of, the E-mail verification module 325 discussed below in reference to FIG. 3.

As discussed above, various embodiments of the disclosed technology enable a simplified payment transaction system for ordinary consumers without the hassle of having to sign up, to remember a user account associated with a password, and to login for sending or receiving every payment transaction, while not sacrificing the essential security feature of authenticating the user for every payment transaction. To send a payment, the user needs to only specify a receiver e-mail address in an e-mail. When the payment e-mail is created, the e-mail can be auto-populated with a security token. The e-mail can also carbon copy (Cc), blind carbon copy (Bcc), or add as a recipient (To) a payment processing e-mail address. When the e-mail is sent, a payment processing system can receive the payment e-mail (e.g., by receiving the payment e-mail through the payment processing e-mail address) and generate a payment receipt interface for the receiver of the e-mail. The payment processing system can asynchronously request financial account information by sending a request e-mail to the payment sender. Upon receiving the financial account information including a payment card number and authenticating the payment card, the sender e-mail address and the payment e-mail are automatically authenticated.

In other embodiments, the e-mail does not need to have a distinct recipient at all. For example, some embodiments compose e-mails that are addressed to: the authentication engine (e.g., authetnicate@company.com) as the only recipient. The payee's e-mail address could be included or identified in another manner. For example, in one embodiment, the payee's e-mail address could be included in the subject line alongside the dollar amount, e.g. "$10 to joe@domain.com". One advantage of this approach is that this technique would ensure that the payee does not receive two e-mails.

It is noted the technology introduced here can be used for any application that requires users to create and login to accounts. Further, while, for convenience, embodiments of the disclosed technology is described with reference to financial transaction service providers, embodiments of the disclosed technology are equally applicable to various other service providers (e.g., social networks) or any application that requires a user to be validated to access their individual account.

Moreover, the technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

General Description

FIG. 1 illustrates an example of a network-based environment 100 in which some embodiments of the disclosed technology may be utilized.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Authentication engine 120 can be executing, or running, on one or more servers and used to authenticate users and/or manage access to service provider 130. Authentication and access control may be based on information received through various user interfaces running on computing devices 110A-110N or other interactions, communications, and/or other inputs (e.g., e-mails, tokens, and/or communications via other channels). Authentication engine 120 can be calibrated/configured by individual companies or service providers, based on risk tolerance and/or other business objectives, to authenticate users. In some cases, access to the individual companies or service providers based may be on different criteria. For example, in addition to rendering an authentication decision, authentication engine 120 may be configured to compute a risk profile or score. That profile may be used by itself to make a decision, or it may be used in conjunction with other profiles, scores, and/or business practices. Authentication engine 120 may also be configured to recommend an access level the user should be granted. In some embodiments, authentication engine 120 includes various data processing and analytic tools that allow for implementation, creation, and evaluation of users and user information retrieved from member databases 125A-125N.

Service provider 130 may be a payment processing system in some embodiments. A sender can use a payment sender device to send a payment to a payment receiver device using a payment processing system. Payment sender device and payment receiver device can be computing devices 110A-110N. As described above, the payment sender device and payment receiver device can be an electronic device with computer functionalities, such as a mobile phone, a desktop computer, a laptop computer, a computer server, a cloud computing environment, a virtualized computing environment, a computer cluster, an application specific integrated circuit, a field programmable gate array, or any combination thereof. The payment processing system can be a computer server, a computer system, a cloud computing environment, a virtualized computing environment, a computer cluster, or any combination thereof. The payment processing system can be computer system 800 described in FIG. 8.

In accordance with various embodiments, a payment transaction can be initiated on the payment sender device. For example, the payment sender device can be a mobile device and the payment transaction can be initiated by a mobile application. The user can click a button on the mobile application and a native e-mail application of the payment sender device can be brought up to draft a payment transaction e-mail. As used here, the term "native e-mail application" refers generally to an application for sending and receiving digital messages, or electronic mail (i.e., "email" or "e-mail"), where the application has been developed for use on a particular platform or device. The native email application can be, for example, the default email application utilized by a computing device's operating system, working in coordination with the processor, to send and/or receive email. In embodiments, the carbon copy ("Cc") field of the native e-mail application (e.g., Gmail™, Outlook™, or Hotmail™) can be automatically filled in with a processing system e-mail address, such as "pay@domain.com." The user can specify a recipient e-mail address in the "TO:" field of the native e-mail application. Alternatively, the recipient e-mail address can be specified in the mobile application that initiates the payment transaction.

The user can enter an amount of payment on either the mobile application or in the "SUBJECT" field of the native e-mail application. The user can also include a message in the body of the e-mail being drafted on the native e-mail application. A security token can be embedded in the e-mail being drafted. The security token can be encrypted. The security token can include information regarding sender e-mail address, device characteristic(s) and/or identifier of the payment sender device, financial account information of the sender user (e.g., debit card account information or credit card account information), or any combination thereof.

Even without the financial account information of the sender user, the e-mail can still be sent from the native e-mail application. However, if the sender user so chooses, the financial account information can be entered on the mobile application and encoded within the security token that is prepopulated and embedded in the e-mail being drafted.

Before the e-mail being drafted (i.e., the payment transaction e-mail) is sent, neither the mobile application nor the native e-mail application requires the sender user to login to a payment system (i.e., not even the payment processing system). When the e-mail is sent, the payment processing system can receive the payment transaction e-mail. For example, the payment processing system can generate an interactive payment receiving interface to include into the body of the payment transaction e-mail.

If no financial account information is embedded in the e-mail, the payment processing system can send a financial account request e-mail to the sender e-mail address requesting that financial account information be entered. The financial account request e-mail can include a secure link to enter the financial account information, such as a debit card number or a credit card number and associated authentication information (e.g., expire date, ZIP Code, PIN number, or security code).

When the payment transaction e-mail is accompanied by the financial account information (either initially embedded in the security token or later entered through the financial account request e-mail), the payment transaction e-mail can be delivered to the recipient e-mail address. The payment transaction e-mail can include the interactive payment receiving interface. The recipient user can choose to accept or reject the payment transaction. In order to receive the payment, the recipient user is not required to sign up to any payment system nor required to login to any payment system (i.e., no need to remember a username and a password).

To receive the payment, the recipient user has to be associated with a financial account. For example, the recipient user can simply input financial account information, such as a debit card number or a credit card number. If the recipient e-mail address has previously received payment and entered financial account information through an interactive payment receiving interface of the payment processing system, then the financial account information can still be associated with the recipient e-mail address. Associations of financial accounts with the recipient e-mail address can be stored on the payment processing system similar to the sender e-mail address. Information of the financial accounts can be used for future authentication of payment e-mails.

Figure 2:
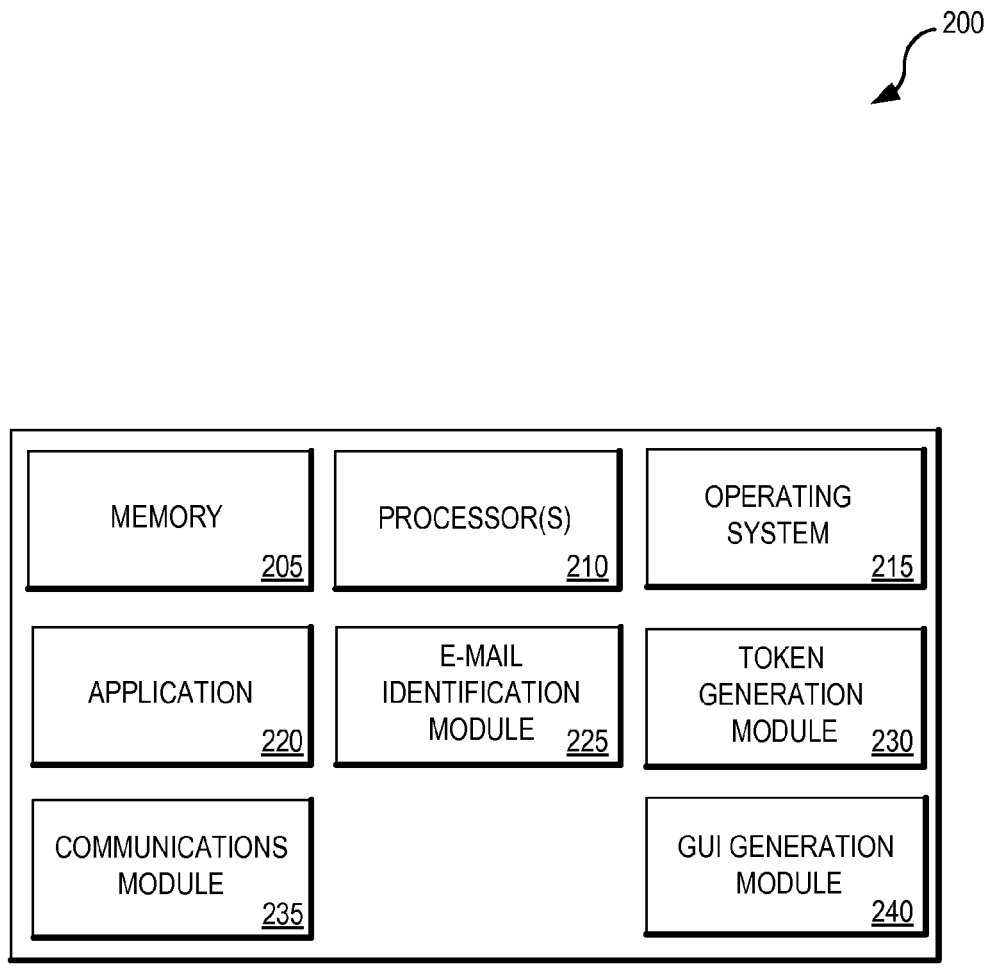
FIG. 2 illustrates various components of a computing device that may be used in accordance with one or more embodiments of the disclosed technology.

FIG. 2 illustrates a set of components within computing device 110 according to one or more embodiments of the disclosed technology. According to the embodiments shown in FIG. 2, computing device 110 can include memory 205, one or more processors 210, operating system 215, application 220, e-mail identification module 225, token generation module 230, communications module 235, and graphical user interface (GUI) generation module 240. Other embodiments of the disclosed technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, application 220, e-mail identification module 225, and token generation module 230 can be combined into a single component.

Memory 205 can be any device, mechanism, or populated data structure used for storing information. In accordance with some embodiments of the disclosed technology, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running, or executing, one or more applications or modules on processor(s) 210. For example, memory 205 could be used in one or more embodiments to house all or some of the instructions needed to execute the functionality of operating system 215, application 220, e-mail identification module 225, token generation module 230, communications module 235, and graphical user interface (GUI) generation module 240.

Operating system 215 can provide a software package that is capable of managing the hardware resources of computing device 110. Operating system 215 can also provide common services for software applications running, or executing, on processor(s) 210. In accordance with various embodiments, operating system 215 can coordinate resources for multiple applications 220 that allow a user to access and interact with service providers. For example, applications 200 can include a money transfer application, a social networking application, a banking application, a gaming application, and the like. Applications 220 can access a server associated with the service provider to retrieve account details. However, before allowing access, a user of application 220 needs to be authenticated. Traditionally, the authentication process has been cumbersome, requiring a username and password be entered by the user.

In contrast, various embodiments provide for a passwordless authentication scheme that uses a native (or default) e-mail application executing, or running, on the computing device to send an e-mail. Once a user launches application 220, e-mail identification module 225 determines the native e-mail application running on computing device 110. E-mail identification module 225 can automatically create an e-mail message by automatically populating the header fields (i.e., To, CC, Subject, etc.) and the body of the message. If multiple e-mail applications are available on the computing device, e-mail identification module 225 may request the user to select the desired e-mail account for the transaction (see, e.g., FIG. 7E).

In some embodiments, token generation module 230 can be used to generate a unique token that can be included in the body. Token generation module 230 can generate a token based on a variety of information such as, but not limited to, mobile device ID, IP address, application ID, application activity (e.g., send $20, access account, etc.), e-mail address used by the native e-mail application, a destination e-mail address identified by the user within the application, device characteristics (e.g., memory, processors, etc.), and/or other information. In accordance with various embodiments, the message may be sent to the destination without any visual acknowledgements to the user. In other embodiments, the message may be populated and visually displayed on a screen. The token may be embedded and/or hidden within the body to that the user cannot easily identify the token. Communications module 235 can send the e-mail to authentication engine 120.

GUI generation module 240 can generate one or more GUI screens that allow for interaction with a user of the computing device. In at least one embodiment, GUI generation module 240 generates a graphical user interface allowing a user of the mobile device to set preferences, prioritize applications, select application functionality, set device constraints, customize messages, and/or otherwise receive or convey information to the user. FIGS. 7A-7K illustrate various examples of graphical user interfaces that can be generated by GUI generation module 240.

Figure 3:
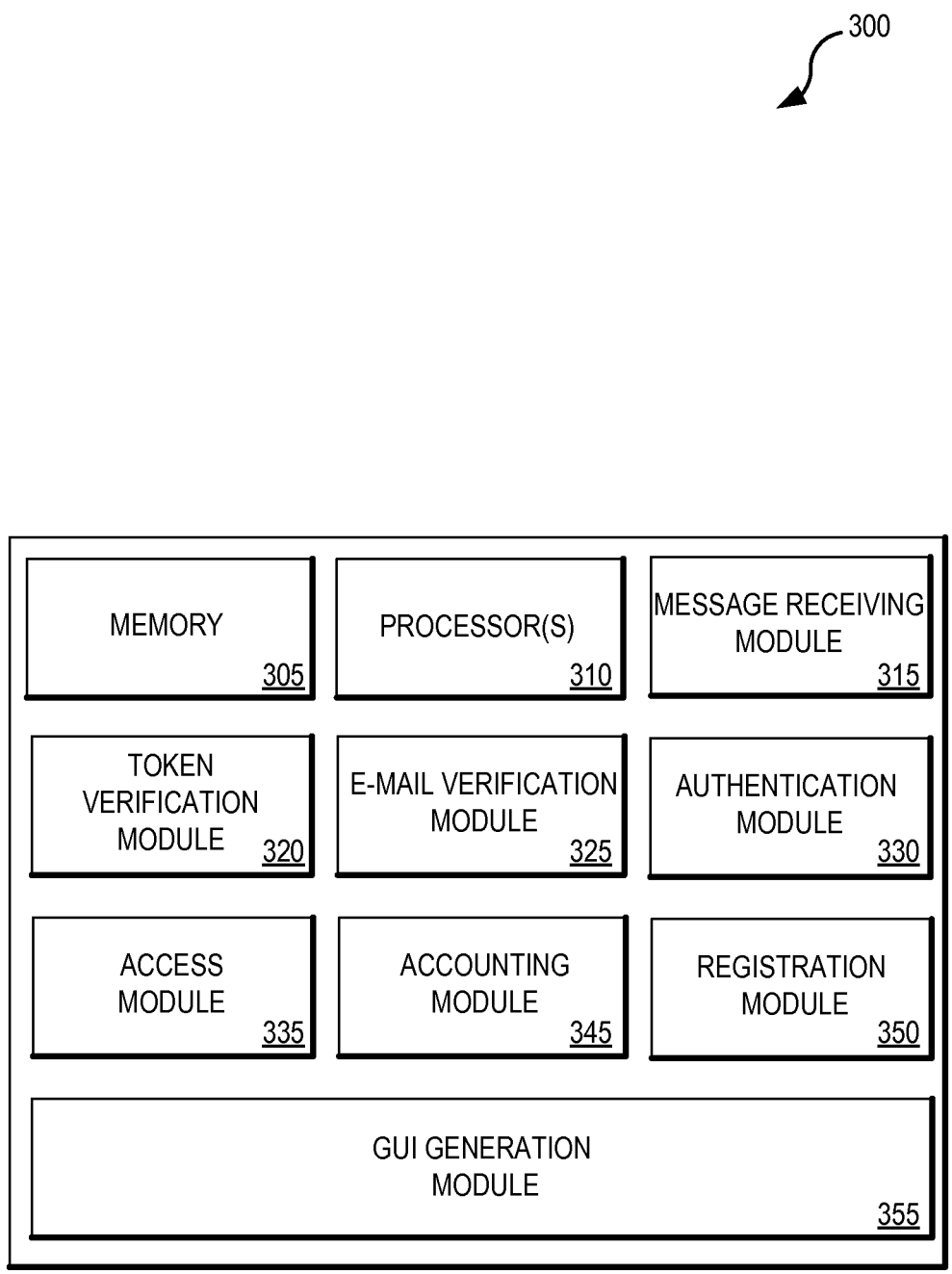
FIG. 3 illustrates various components of an authentication engine that may be used in accordance with various embodiments of the disclosed technology.

FIG. 3 illustrates a set of components within authentication engine 120 according to one or more embodiments of the disclosed technology. According to the embodiments shown in FIG. 3, authentication engine 120 can include memory 305, one or more processors 310, message receiving module 315, token verification module 320, e-mail verification module 325, authentication module 330, access module 335, accounting module 345, registration module 350, and graphical user interface (GUI) generation module 355. Other embodiments of the disclosed technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, token verification module 320, e-mail verification module 325, and authentication module 330 can be combined into a single module for authenticating the user.

Memory 305 can be any device, mechanism, or populated data structure used for storing information as described above for memory 205. Memory 305 may be used to store instructions for executing, or running, one or more applications or modules on processor(s) 310. For example, memory 305 could be used in one or more embodiments to house all or some of the instructions needed to execute the functionality of message receiving module 315, token verification module 320, e-mail verification module 325, authentication module 330, access module 335, accounting module 345, registration module 350, and graphical user interface (GUI) generation module 355.

Message receiving module 315 can receive e-mail messages and identify any tokens embedded within the message. In some embodiments, message receiving module 315 receives the token via other electronic communication mediums (i.e., channels). For example, the electronic communication containing the token can be sent via text message, e-mail, internet relay chat (IRC), file transfer protocol (FTP), hypertext transfer protocol (http), hypertext transfer protocol secure (https), or transmission control protocol/internet protocol (TCP/IP), among others. The electronic communication can contain a unique address identifying to where the communication is to be sent. Examples of the unique address include a phone number, an e-mail address, an internet protocol (IP) address, a uniform resource locator (URL), a host address, and a channel address.

Token verification module 320 validates the token. In some embodiments, for example, token verification module 320 compares the token against a second token sent through an alternate channel. Token verification module 320 can verify several tokens. For example, validation of a token received embedded in an e-mail can verify that the user sent the e-mail, or that the e-mail was sent by the payment facilitation application, the electronic device, and/or the payment facilitation application while running on the electronic device. In such example, the token embedded in the email can be compared against a second token sent through, for example, the payment facilitation application (i.e., alternative channel), to perform the verification.

E-mail verification module 325 can be used to determine if the e-mail messages are from forged sender addresses (i.e., spoofed e-mails). E-mail verification module 325 may combine a variety of known and proprietary techniques for determining the authenticity of the sender. In one example, E-mail verification module 325 verifies that an e-mail is authentically from a user's e-mail address. The user's e-mail address is USERID@DOMAIN.com. E-mail verification module 325 verifies that the e-mail is from the domain (i.e. DOMAIN.com), and that the e-mail is from USERID, the USERID verified to be at DOMAIN.com. In some embodiments, when e-mail verification module 325 is not able to verify that the e-mail is authentic, the e-mail verification module sends an e-mail to the user's e-mail address to verify the authenticity of the received e-mail. The user indicates the authenticity of the e-mail previously received by e-mail verification module 325 by, for example, clicking on a hyperlink in the e-mail sent to the user. E-mail verification module 325 receives notification that the user's clicking on the hyperlink, and authenticates the previously received e-mail.

Authentication module 330 can use the information from token verification module 320 and e-mail verification module 325 along with other information in making an authentication decision. The decision generated by authentication module 330 is used by access module 335 in granting or denying access to a user account held at the service provider. In some embodiments, the decision generated by authentication module 330 is used in granting or denying access to a restricted command. Examples of restricted commands include a command to log a person in to an account, a command to cause a transfer of funds from one account to a second account, and a command accessing restricted data, among others. Examples of accounts that a login command may log a user in to include a social media account, an account at a financial institution, an account at a bank, an account at a credit union, an account at a merchant, an account at a service provider, or an account at a rental provider, among others.

Accounting module 345 may be used to track financial transactions. For example, in some embodiments, service provider 130 (FIG. 1) may charge for access. In other embodiments, accounting module 345 can ensure that payments from a sender to a receiver are properly deducted and credited.

Registration module 350 can be used to register a user with the service provider if the e-mail address has not been previously registered. Graphical user interface (GUI) generation module 355 is similar to GUI generation module 240. GUI generation module 355 can generate one or more GUI screens that allow for interaction with a user of the authentication engine. In at least one embodiment, GUI generation module 355 generates a graphical user interface allowing a user of the mobile device to set preferences, authentication standards, set rules, set constraints, customize messages, and/or otherwise receive or convey information to the user.

Figure 4:
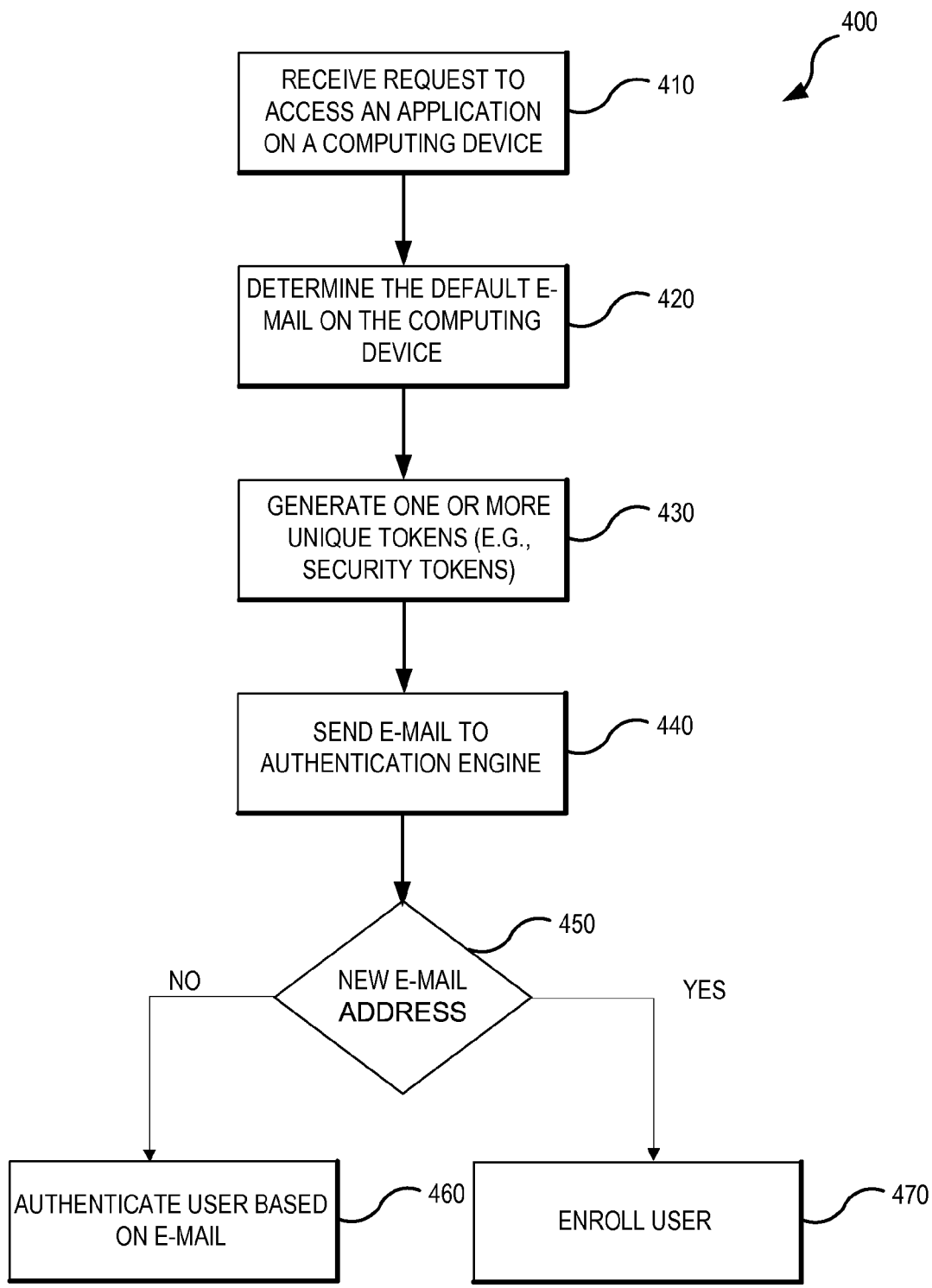
FIG. 4 is a flowchart illustrating a set of operations for authenticating or enrolling a user in accordance with some embodiments of the disclosed technology.

FIG. 4 is a flowchart illustrating a set of operations 400 for authenticating or enrolling a user in accordance with some embodiments of the disclosed technology. The operations illustrated in FIG. 4 may be performed by one or more components, devices, or modules such as, but not limited to, computing devices 110A-110N, authentication engine 120, processor 210, e-mail identification module 225, communications module 235, e-mail verification module 325, registration module 350, or other component or device. As illustrated in FIG. 4, receiving operation 410 receives a request to access an application. In some embodiments, access to the application may require user authentication before allowing access. In other cases, the application may launch and authenticate the user upon receiving a transaction request (e.g., transfer $20 to a recipient, access an account, etc.)

Determination operation 420 determines the native e-mail application running, or executing, on a computing device. This operation can ensure that the user has properly logged into the account and is able to send an e-mail from the computing device. Generation operation 430 generates one or more unique identifiers or tokens. The identifier or token can be based on device characteristics, transaction characteristics, positional information (e.g., from a GPS), and/or other information. The identifier or token can be embedded within the e-mail message and sent to the authentication engine during transmission operation 440.

Once the e-mail has received, determination operation 450 determines if the e-mail address is registered with the service provider. If determination operation 450 determines that the e-mail address has previously been registered, then determination operation 450 branches to authentication operation 460 where the e-mail address is authenticated. If determination operation 450 determines that the e-mail address has not previously been registered, then determination operation 450 branches to registration operation 470 where the user is enrolled with the service provider. In some embodiments, if a user subsequently accesses the application after the user has enrolled (e.g., by going through the flow in FIG. 4), then no e-mail is generated and the application can use the information acquired from the previous enrollment to determine if the user has access.

Figure 5:
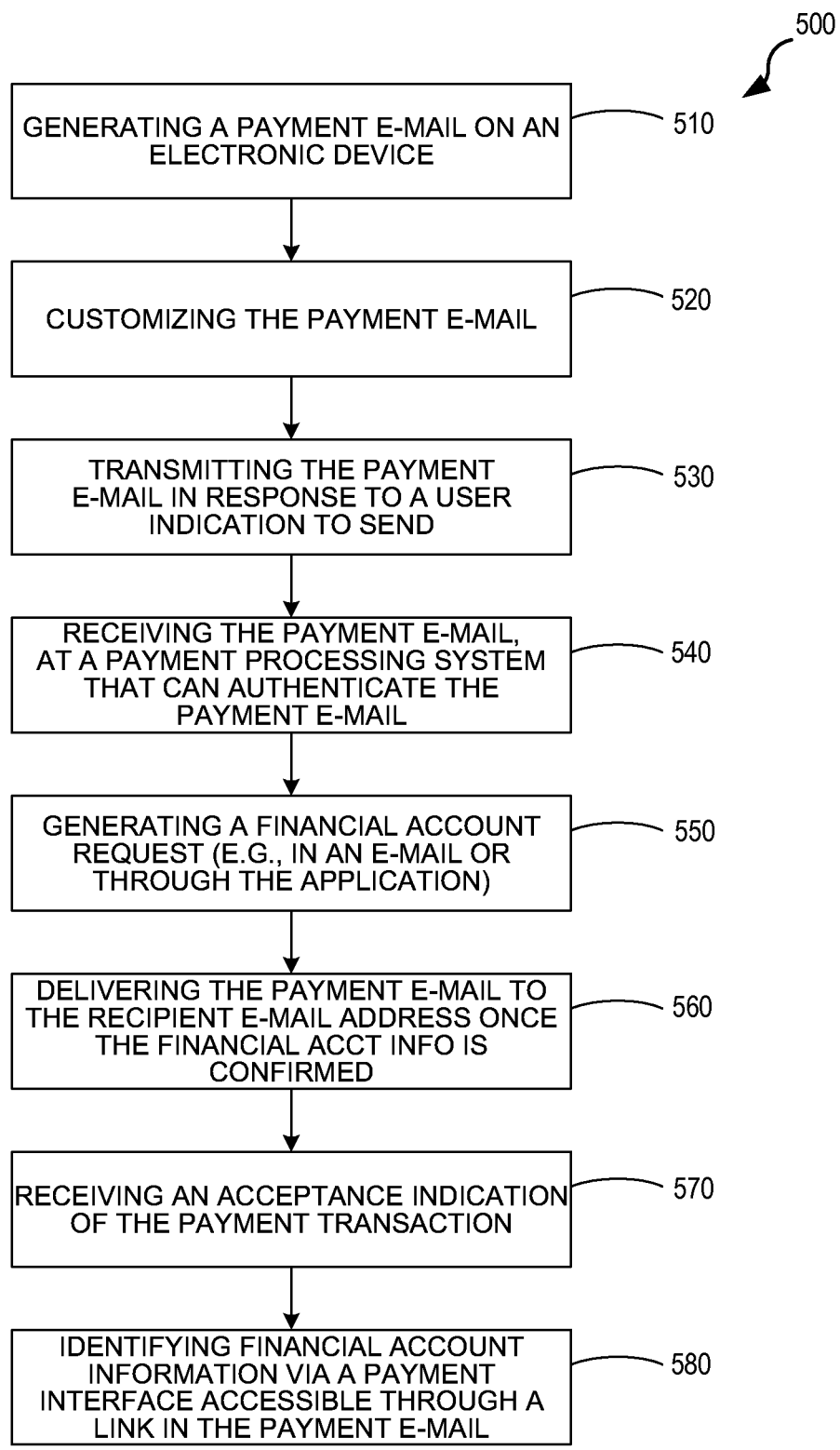
FIG. 5 is a flowchart illustrating a set of operations for sending a cash payment over e-mail in accordance with various embodiments of the disclosed technology.

FIG. 5 is a flowchart illustrating a set of operations 500 for sending a cash payment over e-mail in accordance with various embodiments of the disclosed technology. E-mail operation 510 generates a payment e-mail with one or more pre-populated fields and an embedded security token on an electronic device. The pre-populated fields can include a copy in the header (e.g., Cc, Bcc, or additional recipient in To fields) indicating an e-mail address associated with a payment processing system. If the sender user has previously indicated a payment amount, the pre-populated fields can also include a subject line including the payment amount (e.g., dollar amount or other currency amount). E-mail operation 510 can be performed by the electronic device operated by a sender user, such as the computing device 110A-110N of FIG. 1. Specifically, e-mail operation 510 can be performed by a payment facilitation application on the electronic device.

The embedded security token can be a cryptographic hash function such as a keyed-hash message authentication code (HMAC). The cryptographic hash function may be a one-way cryptographic hash of some agreed-upon data. In some embodiments, the cryptographic hash function may include or be based on an app token as part of the agreed-upon data. By keying the cryptographic hash function with the app token an extra layer of verification can be provided in some embodiments. As a result, another party cannot reverse-compute the app token from a message token, but given the app token, can re-compute the same message token as a way of validation.

In some embodiments, the security token can include or be based on cryptographically secured message based on a sender e-mail address, a device identification of the electronic device, financial account information of the sender user, or any combination thereof. In some embodiments, the security token can be based on a random number and a timestamp. If the sender user has multiple e-mail accounts, the sender user can select which of the e-mail accounts to use. The selected e-mail account can then be used to generate the embedded security token. The sender user can identify financial account information, such as debit card or credit card information, on the payment facilitation application. The financial account information can then be used to generate the embedded security token. However, in some embodiments, the financial account information is not included in the embedded security token. For example, the financial account information can be requested later. For another example, the financial account information can already be associated with the sender e-mail address on a previous transaction, and thus does not need to be re-entered.

Customization operation 520 allows the user to customize the payment e-mail. For example, the electronic device operated by the sender user can receive a customization of the payment e-mail, such as an indication of a recipient e-mail address and a short message in the body of the payment e-mail for the recipient. The customization of the payment e-mail can be received through an e-mail application of the electronic device operated by the sender user. The e-mail application can be a native application to send or receive e-mails. Portions or all of the customization of the payment e-mail can also be received through a separate application, such as the payment facilitation application, on the electronic device that launches the e-mail application prior to sending the payment e-mail. The payment e-mail can be sent in accordance with any standard e-mail format, including any digital media objects that can be embedded or attached under a conventional e-mail format.

The electronic device can transmit the payment e-mail in response to a user indication to send in transmission operation 530. The user indication, for example, can be a click of a button on an e-mail application of the electronic device. A payment processing system, such as the payment processing system, can receive the payment e-mail prior to transmitting the payment e-mail to the recipient e-mail address to authenticate the payment e-mail during receiving operation 540. In various embodiments, the receipt of the payment e-mail is enabled by the payment e-mail sending (e.g., carbon copying) the e-mail to an e-mail address associated with the payment processing system.

The payment processing system can determine whether there are multiple financial accounts associated with the sender e-mail address. If and when the payment processing system determines there is financial account information associated with the sender e-mail address, the payment processing system can determine which financial account is to be used to fund the payment transaction. For example, which financial account to use may be indicated in the embedded security token of the payment e-mail. Receiving operation 540 can include generating a payment receiving interface and including the payment receiving interface in the payment e-mail. Alternatively, the payment receiving interface can be pre-populated during e-mail operation 510 by the payment facilitation application. In some embodiments, the use of e-mail is hidden from the user. For example, the payment facilitation application can generate, customize, and/or send the e-mail based on input that the user provides to the payment facilitation application. The user could be unaware that e-mail is being used, as the payment facilitation application and not the user interacts with the e-mail system.

When the payment processing system determines that no financial account information is associated with the sender e-mail address, the payment processing system can send a financial account request (e.g., in an e-mail directed to the sender e-mail address or directly through the application) to request financial account information from the sender user using sending operation 550. The financial account request can include an interactive interface to enter financial account information.

Once the payment processing system confirms that there is financial account information associated with the sender e-mail address, the payment e-mail can be delivered to the recipient e-mail address during delivery operation 560. The recipient user can then indicate an acceptance of the payment transaction through the payment receiving interface during acceptance operation 570. Alternatively the recipient user can indicate a rejection of the payment transaction.

In order to receive the payment amount of the payment transaction, recipient financial account information has to be associated with the recipient e-mail address. For example, the association of the recipient financial account information can be found on the payment processing system. Alternatively, if there is no record of a prior transaction including the recipient financial account information, the recipient user can identify the recipient financial account information via the payment receiving interface accessible through a link in the payment e-mail during identification operation 580.

Figure 6:
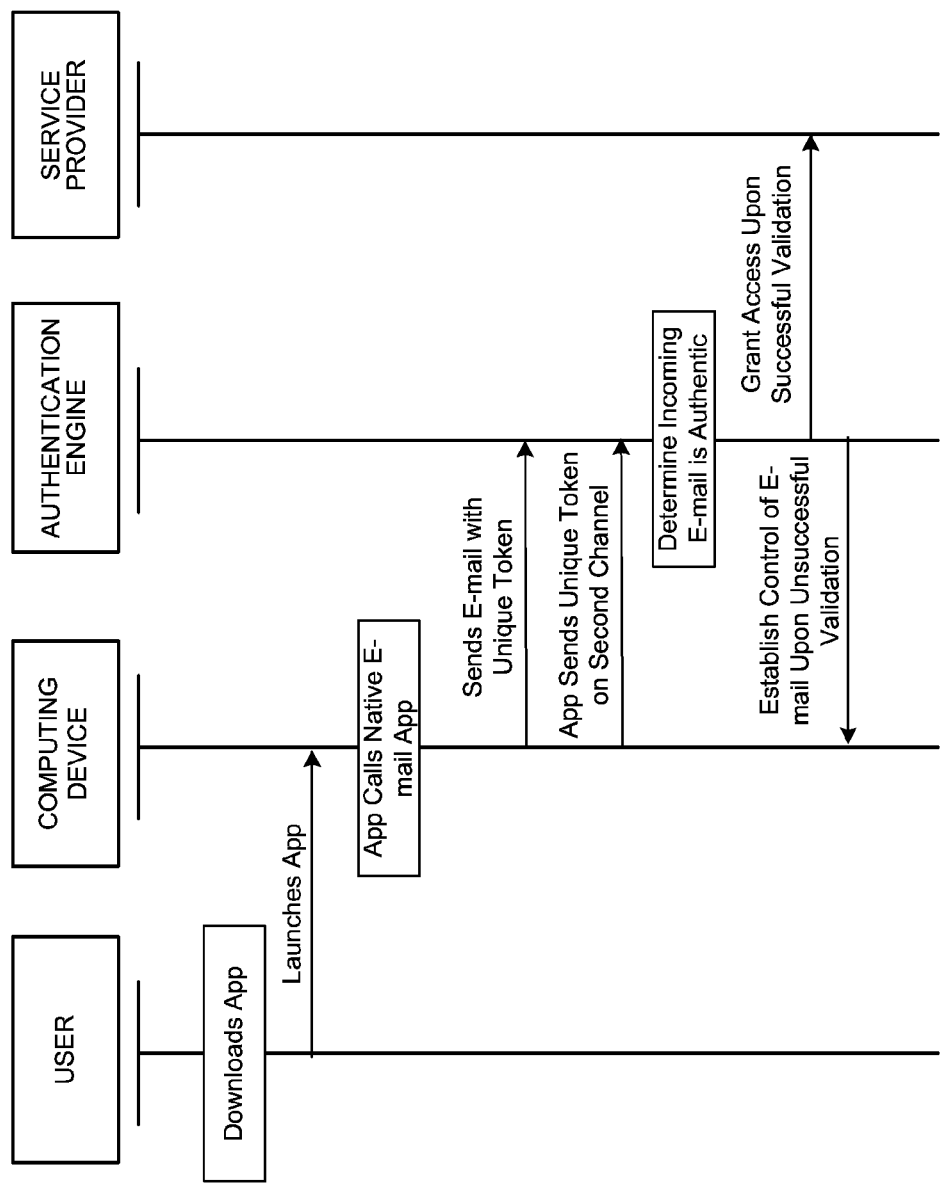
FIG. 6 is a sequence diagram illustrating various interactions between components of a networked-based system in accordance with some embodiments of the disclosed technology.

FIG. 6 is a sequence diagram illustrating various interactions between components of a networked-based system in accordance with some embodiments of the disclosed technology. As illustrated in FIG. 6, a user can download an application on their computing device. The user launches the application. The application calls the native e-mail application and sends (e.g., automatically or upon confirmation by the user) an e-mail message with a unique identifier or token to the authentication engine. In some embodiments, the application may generate a unique application token (e.g., 160 bit apptoken) which can be used to generate the unique identifier or payment token. In addition, the application sends the unique identifier or payment token along with the application token to the authentication engine via another channel. The authentication engine determines if the incoming e-mail is authentic. If the authentication engine can determine the incoming e-mail is authentic, access to the service provider is granted to the application. If the incoming e-mail is not successfully validated, control of the e-mail account can be established through other techniques.

Figure 7A:
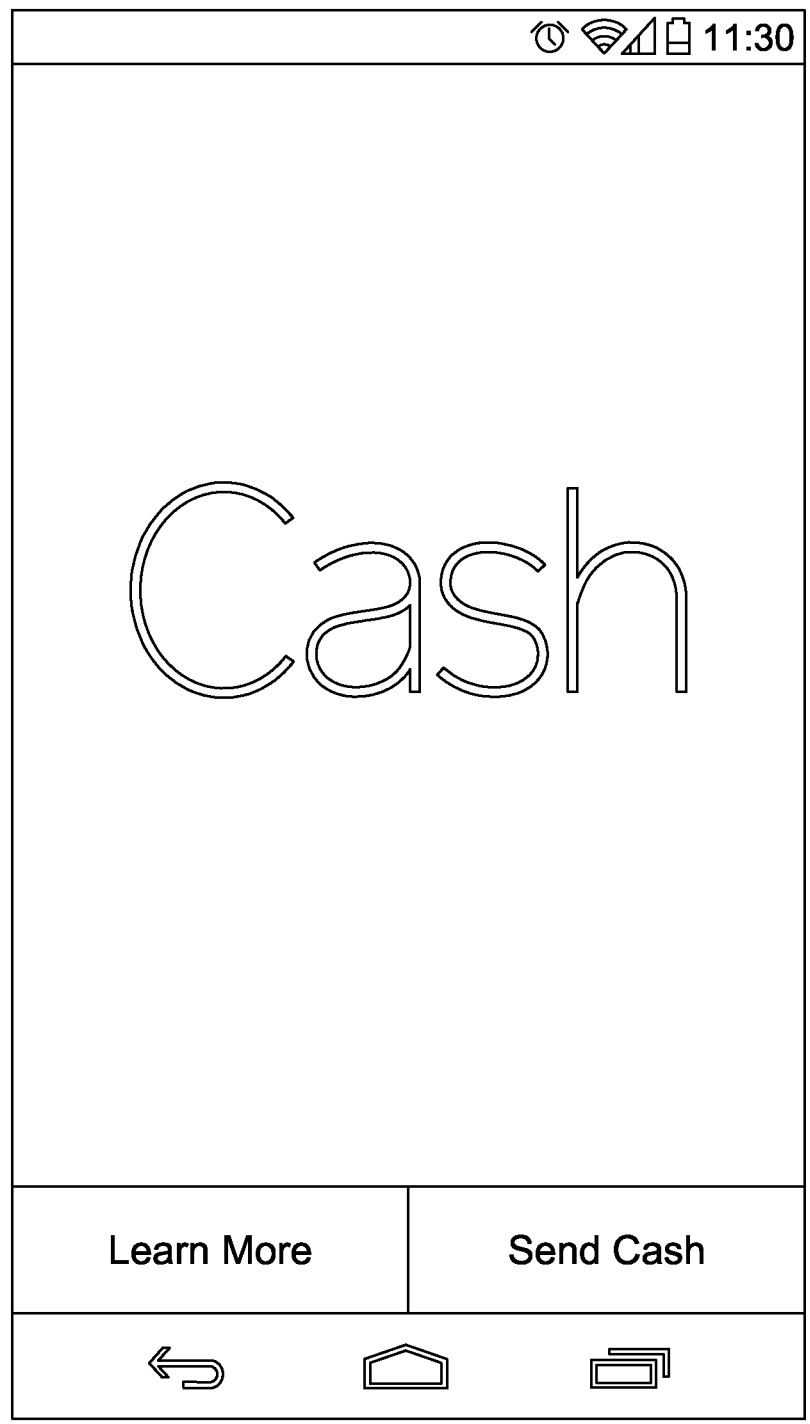
FIG. 7A-7K illustrate various examples of graphical user interface screens that can be used in accordance with one or more embodiments of the disclosed technology.
Figure 7B:
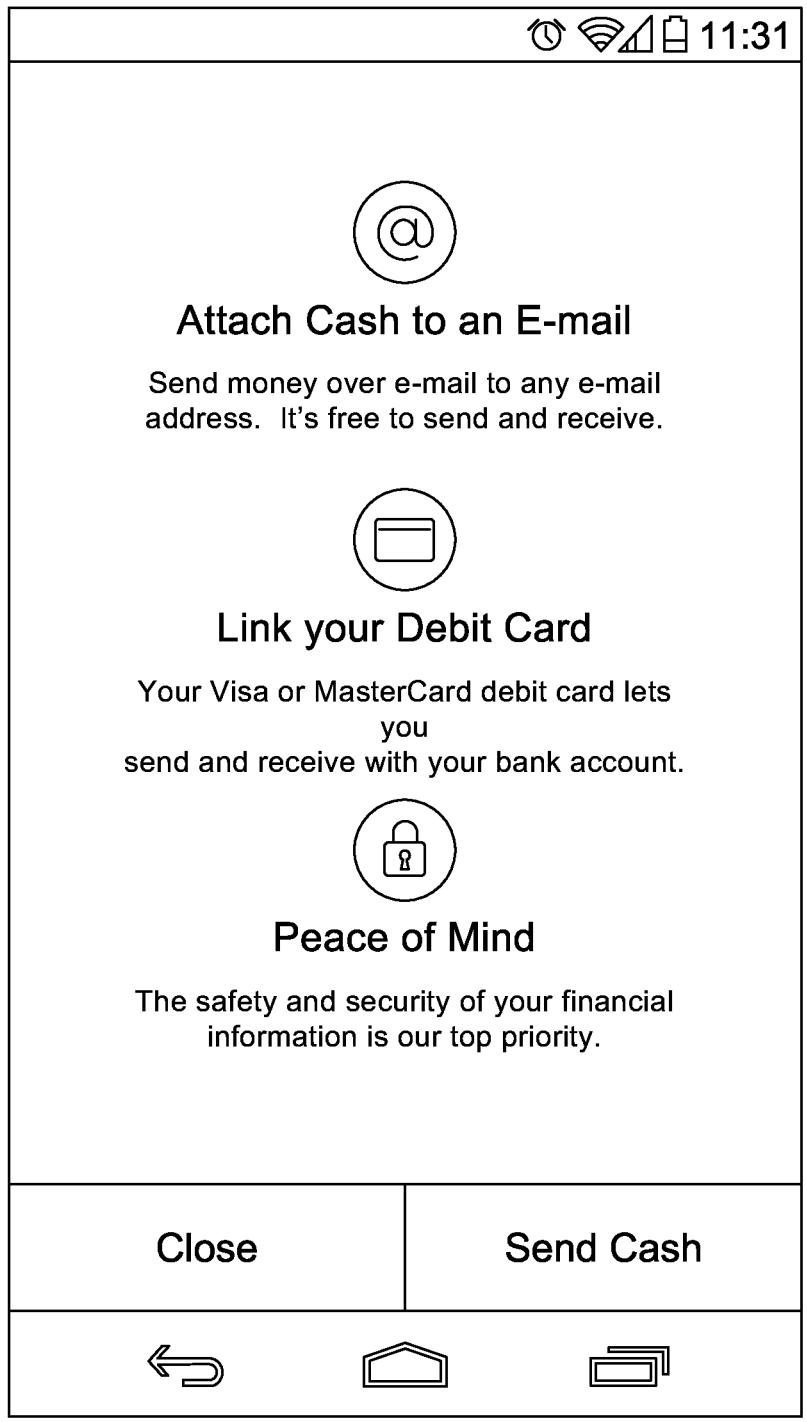
Figure 7C:
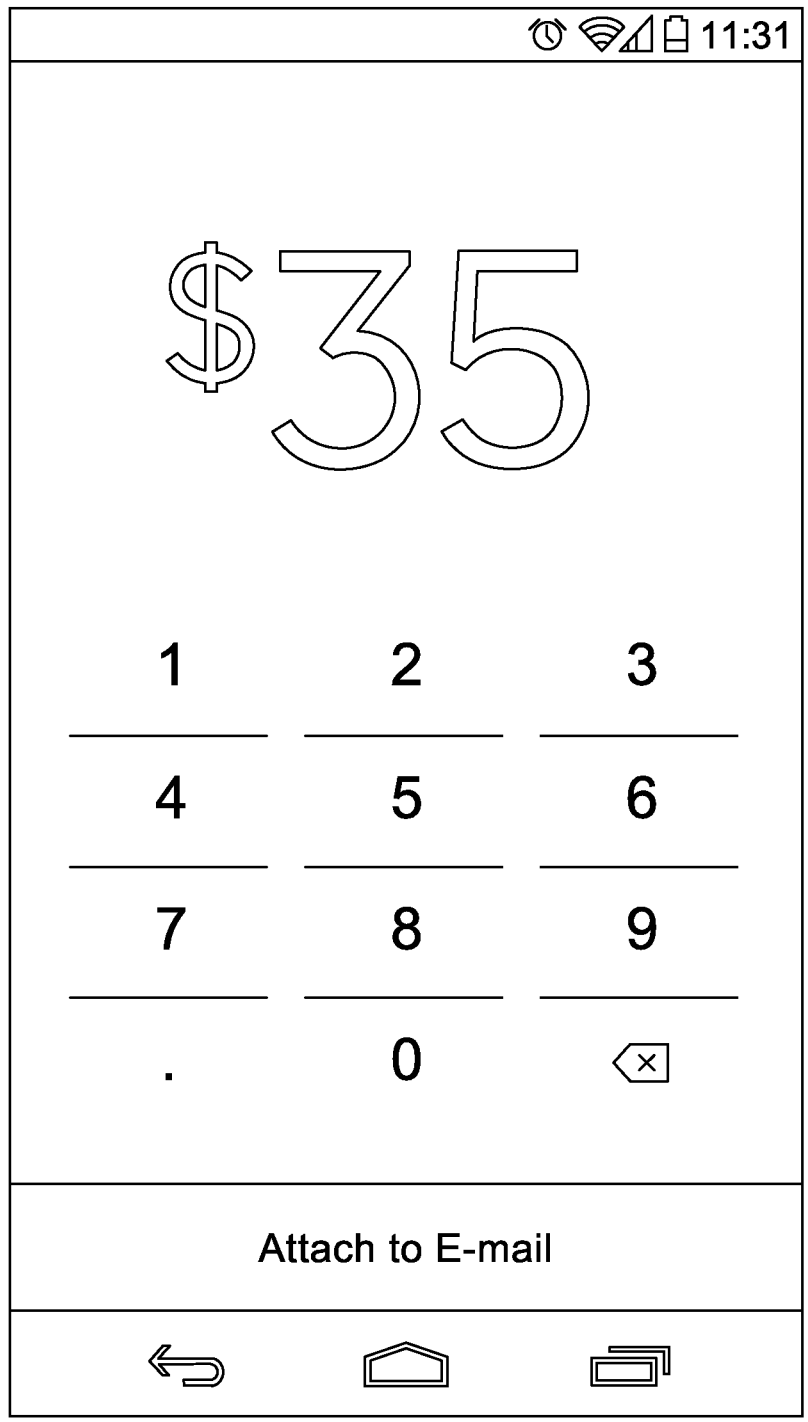
Figure 7D:
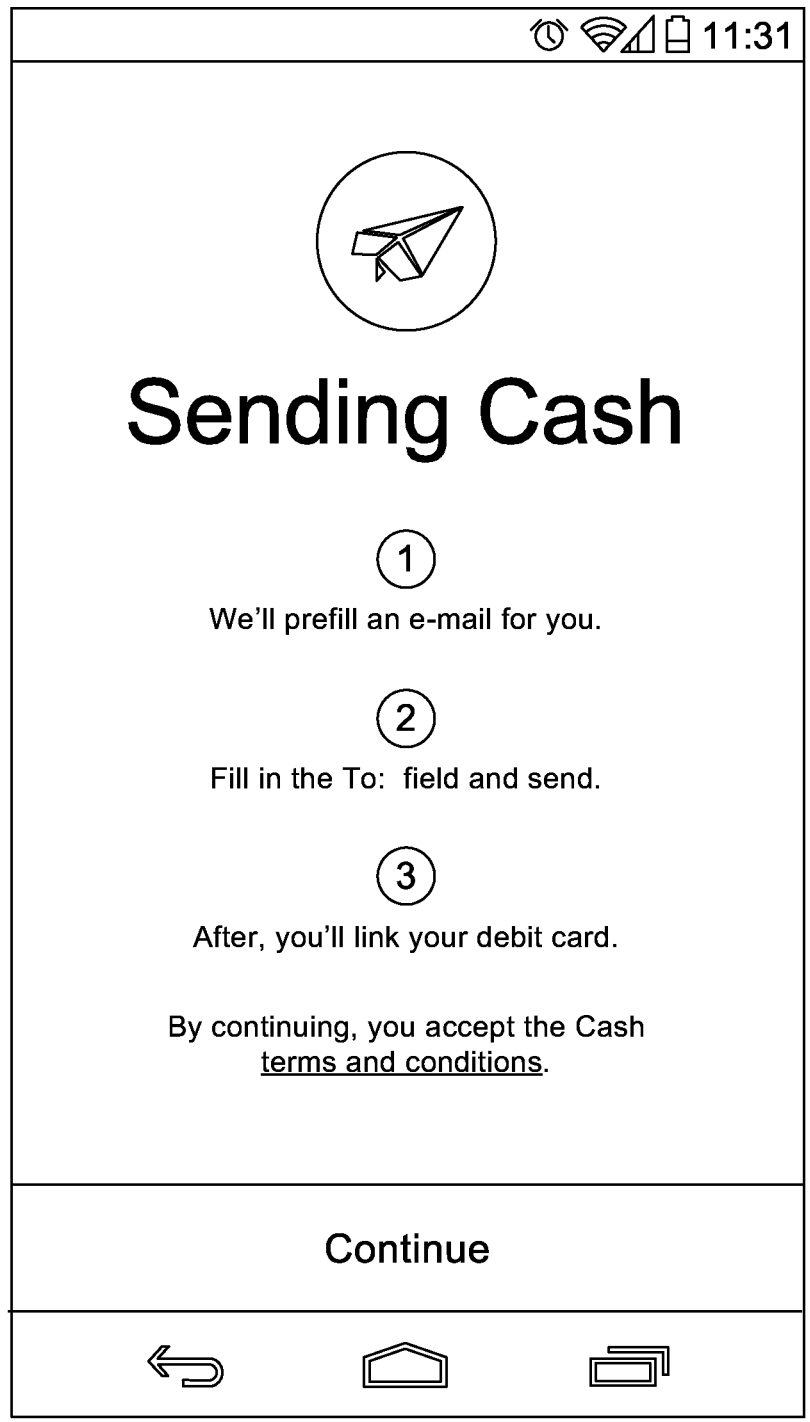
Figure 7E:
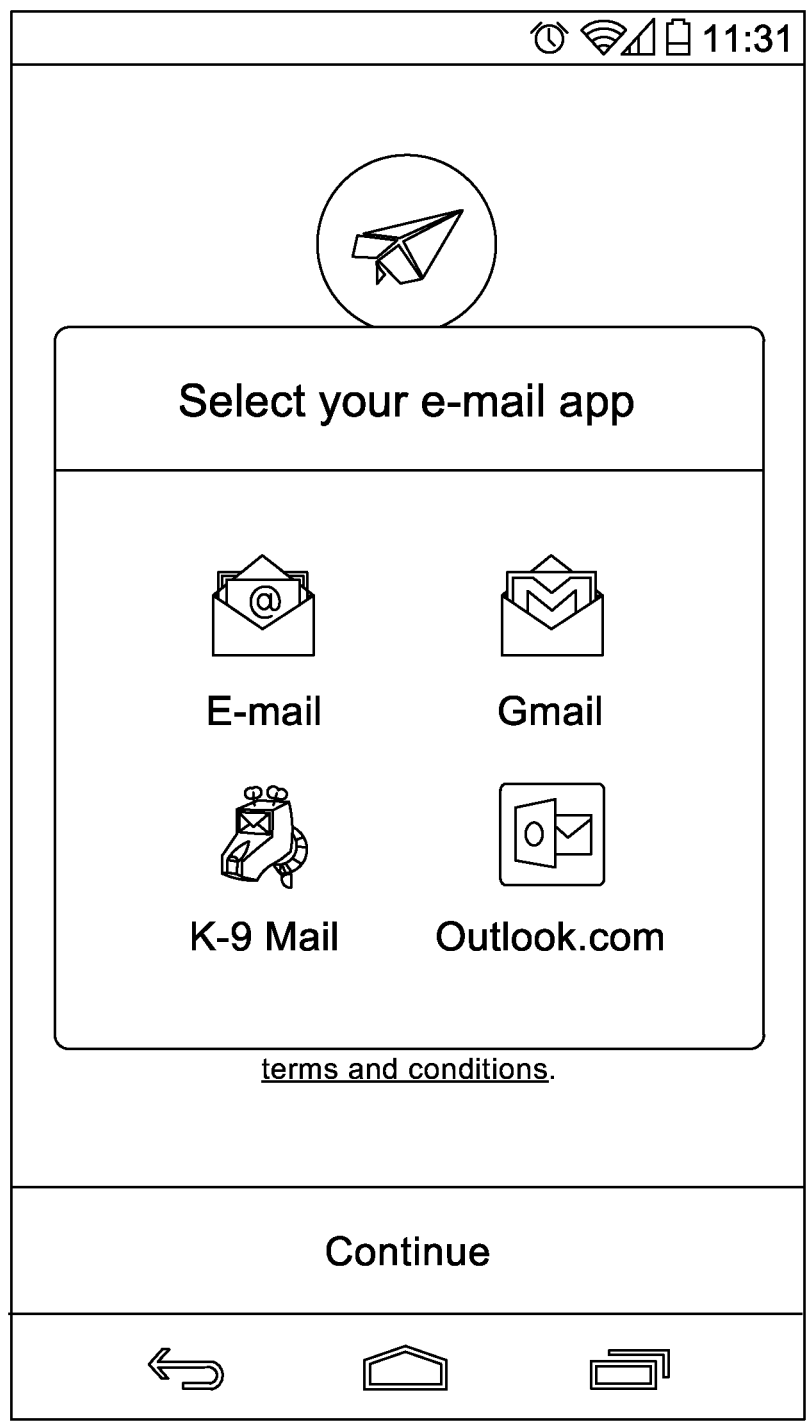
Figure 7F:
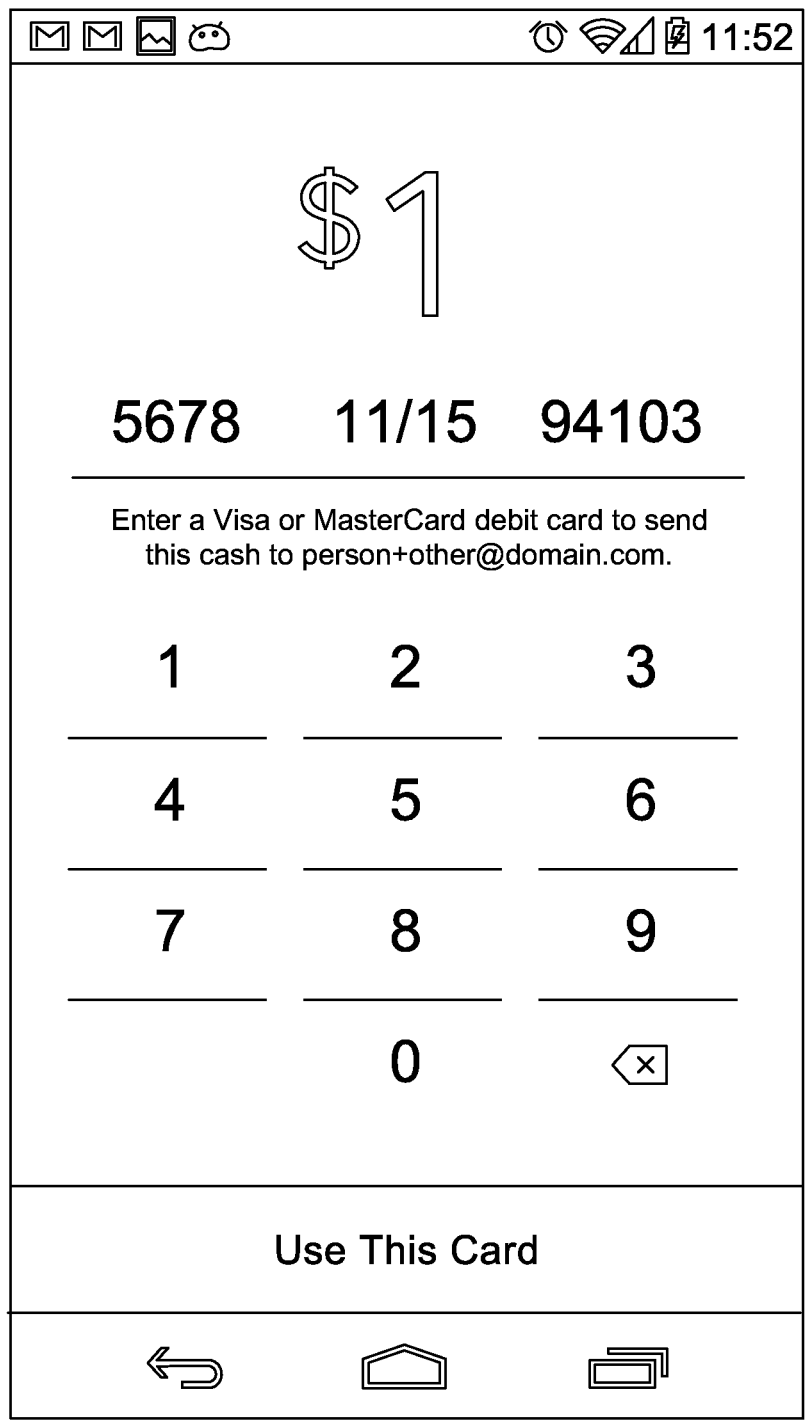
Figure 7G:
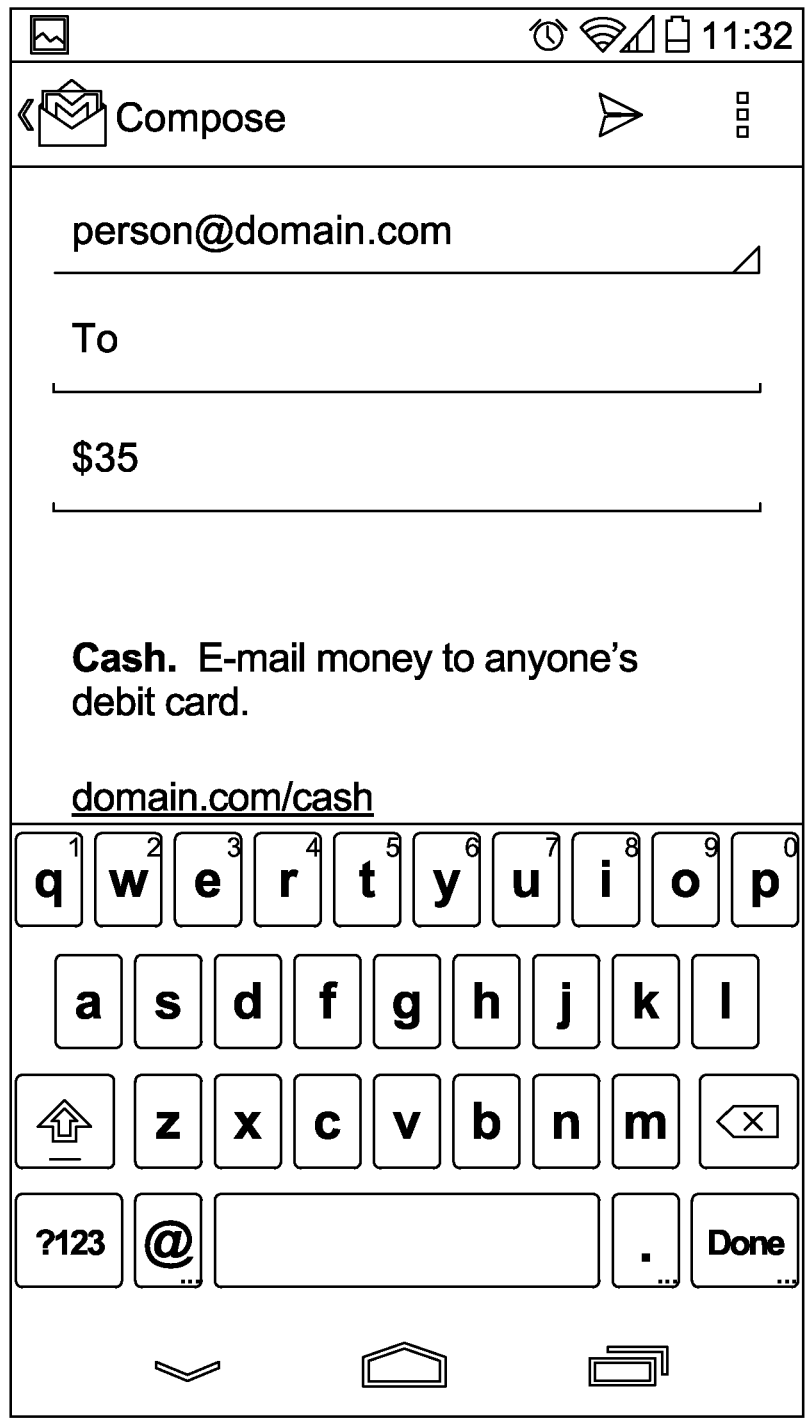
Figure 7H:
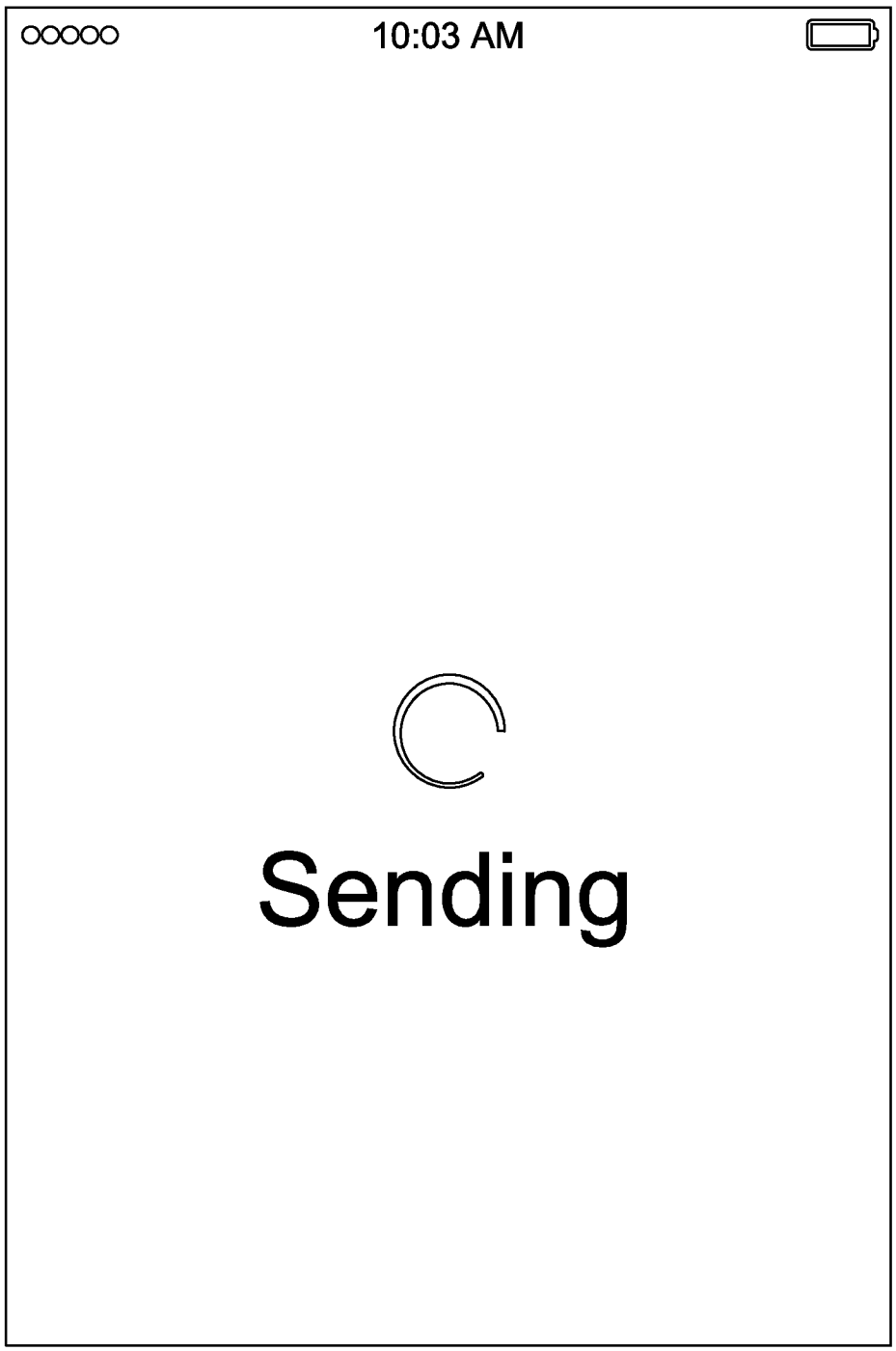
Figure 7I:
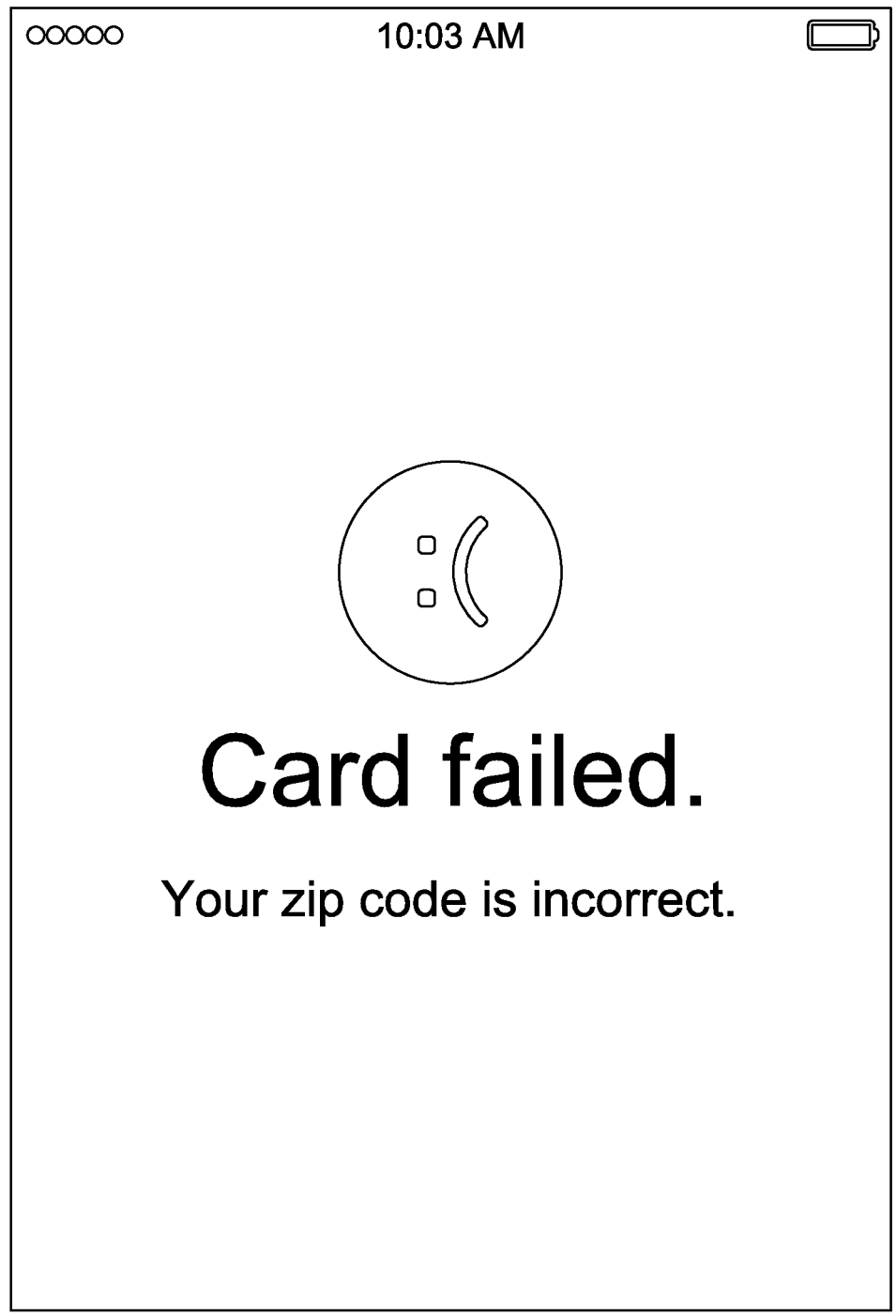
Figure 7J:
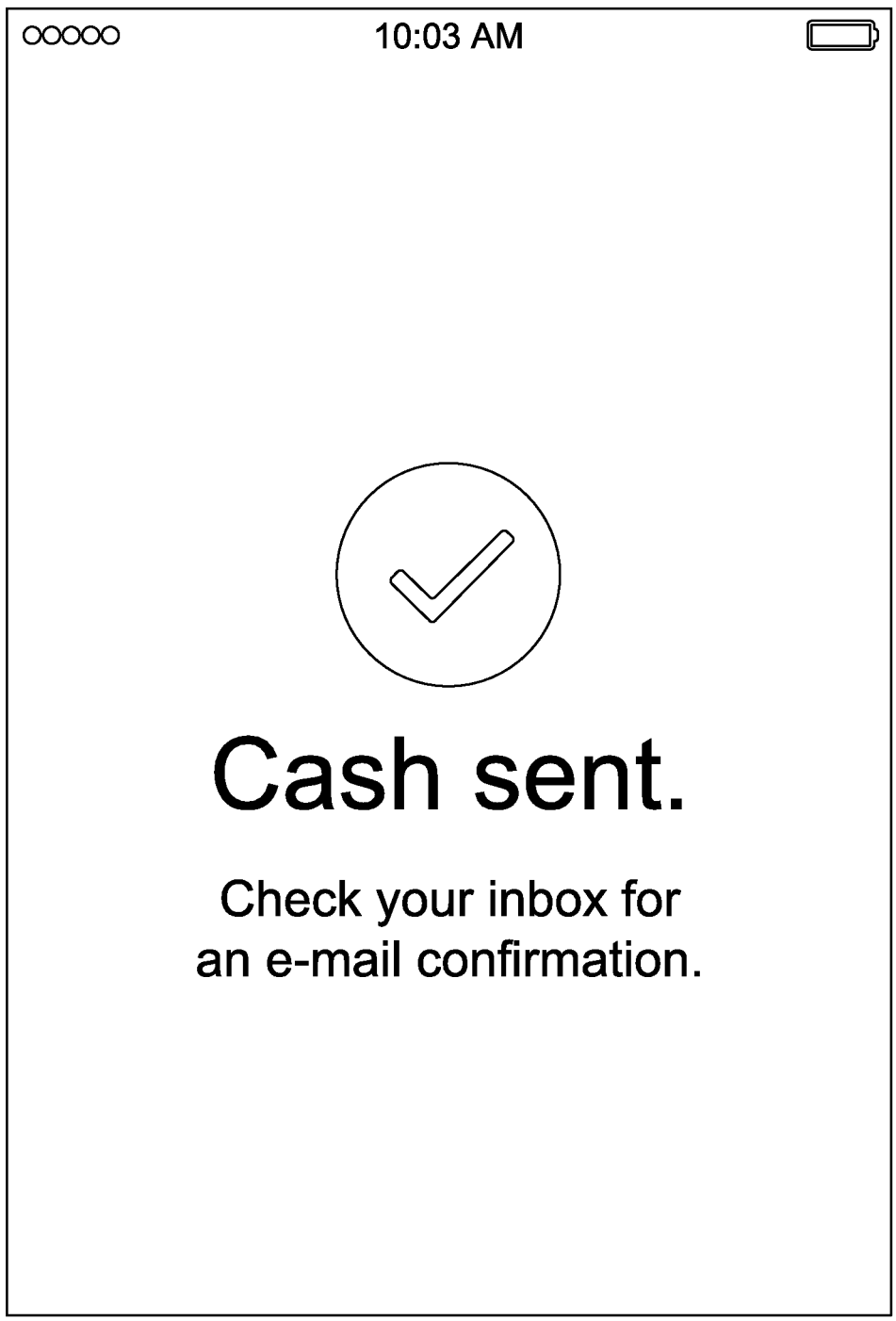
Figure 7K:

FIG. 7A is an example of a startup screen of the payment facilitation application. FIG. 7B is an example of a "learn more" page linked from the start up screen. FIG. 7C is an example of a payment amount entry interface of the payment facilitation application. FIG. 7D is an example process flow of sending a payment through e-mail. FIG. 7E is an example of an e-mail application selection screen from the payment facilitation application. FIG. 7F is an example of an interface to associate a financial account/payment card with an e-mail account, such as the interface used to associate the financial account of the sender user or the interface used to associate the financial account of the recipient user. FIG. 7G is an example of operation 510, where the sender user is customizing the payment e-mail on an e-mail application of the electronic device. FIG. 7H is an example of sending a payment e-mail from the electronic device of the sender user. FIG. 7I is an example of a screen indicating that the financial account information indicated by the sender user or the recipient user has been rejected by the payment processing system. FIG. 7J is an example of a confirmation screen after the payment e-mail is sent. FIG. 7K is an example of an interface to enter financial account information on the payment facilitation application or on an interface in a financial account request e-mail.

Exemplary Computer System Overview

Aspects and implementations of an authentication system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 8:
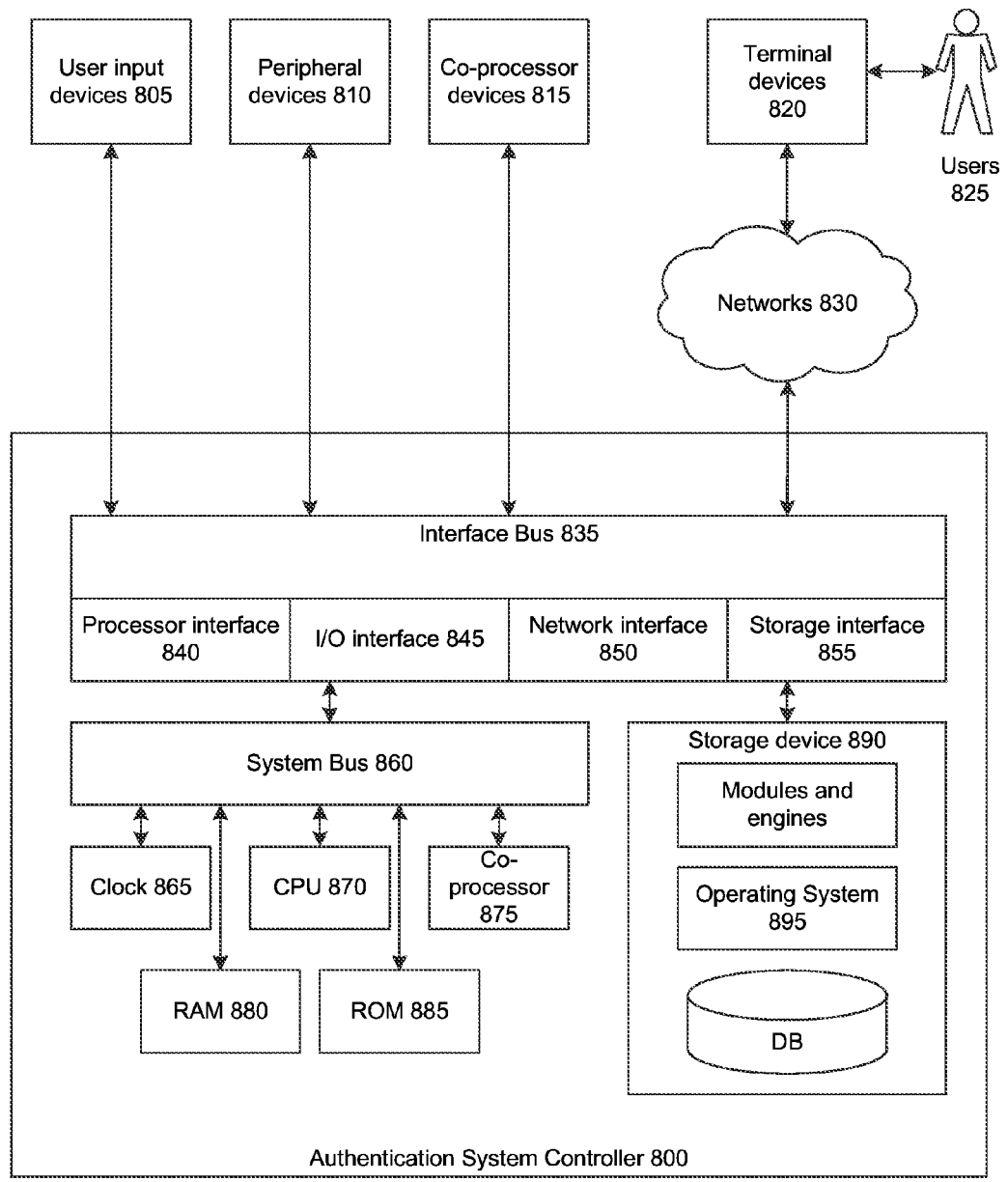
FIG. 8 illustrates an example of a computer system with which some embodiments of the disclosed technology may be utilized.

FIG. 8 is a block diagram illustrating an example machine representing the computer systemization of the authentication system. The authentication system controller 800 may be in communication with entities including one or more users 825, client/terminal devices 820 (e.g., devices 110), user input devices 805, peripheral devices 810, an optional co-processor device(s) (e.g., cryptographic processor devices) 815, and networks 830 (e.g., 115). Users may engage with the controller 800 via terminal devices 820 over networks 830.

Computers may employ central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 800 may include clock 865, CPU 870, memory such as read only memory (ROM) 885 and random access memory (RAM) 880 and co-processor 875 among others. These controller components may be connected to a system bus 860, and through the system bus 860 to an interface bus 835. Further, user input devices 805, peripheral devices 810, co-processor devices 815, and the like, may be connected through the interface bus 835 to the system bus 860. The interface bus 835 may be connected to a number of interface adapters such as processor interface 840, input output interfaces (I/O) 845, network interfaces 850, storage interfaces 855, and the like.

Processor interface 840 may facilitate communication between co-processor devices 815 and co-processor 875. In one implementation, processor interface 840 may expedite encryption and decryption of requests or data. Input output interfaces (I/O) 845 facilitate communication between user input devices 805, peripheral devices 810, co-processor devices 815, and/or the like and components of the controller 800 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 850 may be in communication with the network 830. Through the network 830, the controller 800 may be accessible to remote terminal devices 820 (e.g., client devices 110). Network interfaces 850 may use various wired and wireless connection protocols such as, direct connect, Ethernet, wireless connection such as IEEE 802.11a-x, and the like.

Examples of network 830 include the Internet, Local Area Network (LAN), Metropolitan Area Network (MAN), a Wide Area Network (WAN), wireless network (e.g., using Wireless Application Protocol (WAP), a secured custom connection, and the like. The network interfaces 850 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 855 may be in communication with a number of storage devices such as, storage devices 890, removable disc devices, and the like. The storage interfaces 855 may use various connection protocols such as Serial Advanced Technology Attachment (SATA), IEEE 1394, Ethernet, Universal Serial Bus (USB), and the like.

User input devices 805 and peripheral devices 810 may be connected to I/O interface 845 and potentially other interfaces, buses and/or components. User input devices 805 may include card readers, finger print readers, joysticks, keyboards, microphones, mouse, remote controls, retina readers, touch screens, sensors, and/or the like. Peripheral devices 810 may include antenna, audio devices (e.g., microphone, speakers, etc.), cameras, external processors, communication devices, radio frequency identifiers (RFIDs), scanners, printers, storage devices, transceivers, and/or the like. Co-processor devices 815 may be connected to the controller 800 through interface bus 835, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 800 may employ various forms of memory including on-chip CPU memory (e.g., registers), RAM 880, ROM 885, and storage devices 890. Storage devices 890 may employ any number of tangible, non-transitory storage devices or systems such as fixed or removable magnetic disk drive, an optical drive, solid state memory devices and other processor-readable storage media. Computer-executable instructions stored in the memory may have one or more program modules such as routines, programs, objects, components, data structures, and so on that perform particular tasks or implement particular abstract data types. For example, the memory may contain operating system (OS) component 895, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such a database include DB2, MySQL, Oracle, Sybase, and the like. Alternatively, the database may be implemented using various standard data-structures, such as an array, hash, list, struct, structured text file (e.g., XML), table, and/or the like. Such data-structures may be stored in memory and/or in structured files.

The controller 800 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 800 may be distributed electronically over the Internet or over other networks (including wireless networks). Those skilled in the relevant art will recognize that portions of the authentication system may reside on a server computer, while corresponding portions reside on a client computer. Data structures and transmission of data particular to aspects of the controller 800 are also encompassed within the scope of the invention.

The above Detailed Description of embodiments of the disclosure is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel, or may be performed at different times.

In conclusion, the disclosed technology provides novel systems, methods and arrangements for account creation and login by sending e-mails. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features.

What is claimed is:

1. A computer-implemented method, executed by a payment processing system for processing payments, comprising:
    receiving, through a payment application running on a mobile device of a sender, a request to transfer money from the sender to a recipient, the request including a payment amount, the payment amount being entered by the sender into the payment application to indicate an amount of money to be transmitted to the recipient, wherein the payment application is associated with the payment processing system and is configured to communicate with an email application running on the mobile device of the sender to generate and send emails to the payment processing system for processing the payments;
    upon receiving the request,
        launching, by the payment application, the email application running on the mobile device of the sender; and
        upon launching the email application, communicating by the payment application with the email application, wherein said communicating results in the email application generating an email for presentation to the sender at the mobile device and prepopulating the email with the payment amount, previously entered into the payment application by the sender, and a payment processing email address associated with the payment processing system, the payment amount being pre-populated in a subject line of the email, wherein the email includes a field to receive, from the sender, a recipient email address associated with the recipient;

receiving, at the mobile device, the recipient email address associated with the recipient and an indication to send the email from the sender;

receiving, by the payment processing system, the email originating from the mobile device of the sender and sent to the payment processing system based on recipient information included in the email, the recipient information including the recipient email address and the payment processing email address, wherein the email, based on the recipient information, is further received at a mobile device of the recipient; and causing, by the payment processing system, the payment amount to be transferred to the recipient associated with the recipient email address based on the email received, said causing the payment amount to be transferred including:

analyzing the email to identify a sender email address and the recipient email address;

retrieving, from a database coupled to the payment processing system, stored data associated with the sender email address and with the recipient email address;

determining, based on the stored data, a sender financial account associated with the sender email address and a recipient financial account associated with the recipient email address; and transferring the payment amount from the sender financial account to the recipient financial account based on said determining.

2. The computer-implemented method of claim 1, wherein the request to transfer money is submitted by the sender via an interface associated with the payment application, the interface enabling the sender to specify the payment amount for the request to transfer money, and wherein the payment amount is utilized to pre-populate the email with the payment amount and the payment processing email address associated with the payment processing system.

3. The computer-implemented method of claim 1, wherein determining, based on the stored data, the sender financial account and the recipient financial account comprises:

determining, by the payment processing system, whether the sender has a service account associated with the payment processing system based on the sender email address associated with the sender included in the email;

in response to a determination that the sender does not have the service account, transmitting, by the payment processing system, a linking invitation requesting the sender to submit financial account information associated with a first financial account of the sender;

in response to receiving the financial account information from the sender:

generating, by the payment processing system, the service account for the sender; and associating, by the payment processing system, the service account with the first financial account of the sender, wherein the first financial account of the sender is utilized to transfer the payment amount to the recipient.

4. The computer-implemented method of claim 1, further comprising:

in response to a determination that any of the sender and the recipient has not linked a particular financial account, generating and transmitting, by the payment processing system, a linking invitation requesting the sender and the recipient, respectively, to each submit financial account information for linking the particular financial account with the request to transfer money.

5. A computer-implemented method comprising:

receiving, at a mobile device of a sender, a request to transfer money from the sender to a recipient, the request including a payment amount entered by the sender at the mobile device;

upon receiving the request, launching an email application running on the mobile device of the sender;

communicating with the email application, said communicating resulting in the email application generating an email for presentation to the sender and prepopulating, the email with the payment amount and a payment processing email address associated with a payment processing system, the payment amount being pre-populated in a subject line of the email, wherein the email includes a field to receive, from the sender, a recipient email address associated with the recipient;

receiving, at the mobile device, the recipient email address associated with the recipient and an indication to send the email from the sender;

transmitting the email to the payment processing system, wherein the payment processing system, in response to receiving the email message, performs the steps of identifying a sender email address and the recipient email address from the email message received, retrieving, from a database coupled to the payment processing system, stored data associated with the sender email address and with the recipient email address, determining, based on the stored data, a sender financial account associated with the sender email address and a recipient financial account associated with the recipient email address, and transferring, from the sender financial account to the recipient financial account based on said determining, the payment amount indicated in the subject line of the transmitted email.

6. The computer-implemented method of claim 5, further comprising:

receiving, at the mobile device of the sender, one of multiple linking invitations requesting the sender to associate a payment vehicle with the request to transfer money from the sender to the recipient, the multiple linking invitations generated by the payment processing system, in response to the transmission of the email, to request the sender and the recipient to each associate the payment vehicle with the request to transfer money.

7. The computer-implemented method of claim 6, wherein said one linking invitation of the multiple linking invitations is presented to the sender via an interface of the mobile device of the sender.

8. The computer-implemented method of claim 6, wherein the payment vehicle includes a debit card, a credit card, or a bank account.

9. The computer-implemented method of claim 6, further comprising:

generating, in response to an indication to accept said one linking invitation of the multiple linking invitations, a graphical user interface allowing the sender to enter financial account information for the payment vehicle.

10. The computer-implemented method of claim 5, wherein the request to transfer money is submitted by the sender via an interface of the mobile device of the sender, the interface enabling the sender to specify the payment amount for the request to transfer money, and wherein the payment amount is utilized to pre-populate the email with the payment amount and the payment processing email address associated with the payment processing system.

11. The computer-implemented method of claim 5, further comprising:
identifying a particular email application running on the mobile device of the sender, wherein the identified particular email application is the email application that generates and presents the email.

12. The computer-implemented method of claim 5, wherein the payment amount is caused to be transferred without requiring the sender to submit login credentials for accessing a service account associated with the payment processing system to submit the request to transfer money.

13. The computer-implemented method of claim 5, wherein the email to the payment processing system is generated without requiring the sender to create a service account with the payment processing system or to submit login credentials for accessing the service account.

14. A payment processing system, comprising:
a processor;
a communications module; and
a non-transitory computer-readable storage medium containing a set of instructions comprising:
instructions for communicating, with a payment application running on a mobile device of a sender, to receive at the payment application a request to transfer money from the sender, the request to transfer money including a payment amount entered by the sender into the payment application to indicate an amount of money to be transmitted to the recipient, wherein the payment application is associated with the payment processing system and is configured for communicating with an email application running on the mobile device of the sender, wherein said communicating results in the email application generating a payment email and sending the payment email to the payment processing system for processing a payment transfer to the recipient;
instructions for receiving, via the communications module, the payment email originating from the mobile device requesting an initiation of a money transfer using the payment processing system, wherein the payment processing system does not require either the sender or the recipient of the money transfer to be registered with the payment processing system for initiating the money transfer, wherein the payment email includes a recipient email address, a payment processing email address associated with the payment processing system, and, in a subject line of the payment email, a payment amount submitted to the payment application by the sender for the money transfer, and wherein the payment email is further received by the recipient;
instructions for analyzing the payment email to identify a sender email address and the recipient email address;
instructions for retrieving, from a database coupled to the payment processing system, stored data associated with the sender email address and with the recipient email address;
instructions for determining, based on the stored data, a sender financial account associated with the sender email address and a recipient financial account associated with the recipient email address; and
instructions for processing the money transfer upon determining the sender financial account associated with the sender and the recipient financial account associated with the recipient, wherein the instructions for processing the money transfer includes instructions for transferring the payment amount from the sender financial account to the recipient financial account.

15. The payment processing system of claim 14, wherein the payment amount is submitted by the sender through an interface of the payment application running on the mobile device of the sender.

16. The payment processing system of claim 15, wherein the payment email is generated without requiring the sender to submit login credentials to login a service account associated with the payment processing system.

17. The payment processing system of claim 15, wherein the payment processing email address is generated in response to the payment amount submitted by the sender through the interface of the payment application.

18. The payment processing system of claim 14, wherein the set of instructions further comprises:
instructions for determining whether the sender has a service account associated with the payment processing system based on the sender email address;
instructions for, in response to a determination that the sender does not have the service account, generating and transmitting, to the sender email address, a linking invitation requesting the sender to submit financial account information associated with a first financial account of the sender;
instructions for, in response to receiving the financial account information from the sender:
generating the service account for the sender; and
associating the service account with the first financial account of the sender, wherein the first financial account of the sender is utilized in the money transfer.

19. The payment processing system of claim 14, wherein the set of instructions further comprises:
instructions for determining whether the recipient has a service account associated with the payment processing system based on the recipient email address;
instructions for, in response to a determination that the recipient does not have the service account, generating and transmitting, to the recipient email address, a linking invitation requesting the recipient to submit financial account information associated with a second financial account of the recipient;
instructions for, in response to receiving the financial account information from the recipient:
generating the service account for the recipient; and
associating the service account with the second financial account of the recipient, wherein the second financial account of the recipient is utilized in the money transfer.

20. The payment processing system of claim 14, wherein the set of instructions further comprises instructions for authenticating the payment email by determining if the sender email address has been spoofed.

21. The payment processing system of claim 14, wherein the set of instructions further comprises instructions for monitoring a total amount of money transfers requested by the sender during a time period, and instructions for, upon determining that the total amount exceeds a threshold, generating an identity verification request.

22. The payment processing system of claim 21, wherein the identity verification request is a request for social media login credentials or a request for a full name, a date of birth, and last four digits of a social security number of the sender.

* * * * *